(12) United States Patent
Avanzi

(10) Patent No.: US 9,949,115 B2
(45) Date of Patent: Apr. 17, 2018

(54) COMMON MODULUS RSA KEY PAIRS FOR SIGNATURE GENERATION AND ENCRYPTION/DECRYPTION

(71) Applicant: QUALCOMM Incorporated, San Diego, CA (US)

(72) Inventor: Roberto Avanzi, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/616,552

(22) Filed: Feb. 6, 2015

(65) Prior Publication Data

US 2016/0043870 A1 Feb. 11, 2016

Related U.S. Application Data

(60) Provisional application No. 62/010,400, filed on Jun. 10, 2014.

(51) Int. Cl.
*H04L 29/06* (2006.01)
*H04W 12/04* (2009.01)
(Continued)

(52) U.S. Cl.
CPC .......... *H04W 12/04* (2013.01); *H04L 9/0861* (2013.01); *H04L 9/302* (2013.01); *H04L 9/3249* (2013.01); *H04L 63/062* (2013.01)

(58) Field of Classification Search
CPC ................................. G06F 21/00; H04L 9/00
See application file for complete search history.

(56) References Cited

U.S. PATENT DOCUMENTS 5,351,298 A 9/1994 Smith
5,848,159 A 12/1998 Collins et al.
(Continued)

FOREIGN PATENT DOCUMENTS

WO     WO-9823061 A1     5/1998

OTHER PUBLICATIONS

Aono Y, "Minkowski Sum based Lattice Construction for Multivariate Simultaneous Coppersmith's Technique and Applications to RSA," International Association for Cryptologic Research vol. Mar. 4, 2013: 030211, Mar. 4, 2013 (Mar. 4, 2013), pp. 1-19, XP061007156, [retrieved on Mar. 4, 2013].
(Continued)

*Primary Examiner* — Joseph P Hirl
*Assistant Examiner* — Leynna Truvan
(74) *Attorney, Agent, or Firm* — Jae-Hee Choi; Loza & Loza LLP

(57) ABSTRACT

Various features pertain to embedded key generation and provisioning systems, such as systems installed within smartphones for generating public-key/private-key pairs for use in encryption/decryption and digital signature generation. In some examples, an embedded system is provided that generates two public-key/private-key pairs—one for encryption/decryption and the other for signing/verification—where the two public-key/private-key pairs share a common modulus but are otherwise distinct or uncorrelated. This allows the two key pairs to be generated more efficiently than if two entirely separate key pairs were generated and yet, at least in the context of embedded systems, satisfactory integrity and confidentiality is achieved. Techniques for decrypting and signing messages using common modulus keys are described for use by an embedded component of a mobile device, along with techniques for encrypting and verifying messages for use by a remote
(Continued)

system such as a key provisioning server of a partner software vendor.

30 Claims, 18 Drawing Sheets

(51) Int. Cl.
  *H04L 9/30* (2006.01)
  *H04L 9/08* (2006.01)
  *H04L 9/32* (2006.01)

(56) References Cited

U.S. PATENT DOCUMENTS

| | | | |
|---|---|---|---|
| 6,810,122 B1* | 10/2004 | Miyazaki | H04L 9/085 380/277 |
| 723,040 A1 | 6/2007 | Collins et al. | |
| 8,437,473 B2 | 5/2013 | Gantman et al. | |
| 2002/0029200 A1 | 3/2002 | Dulin et al. | |
| 2002/0087884 A1 | 7/2002 | Shacham et al. | |
| 2004/0111607 A1* | 6/2004 | Yellepeddy | H04L 9/3255 713/155 |
| 2008/0226064 A1* | 9/2008 | Douguet | G06F 7/723 380/30 |
| 2008/0240443 A1 | 10/2008 | Vuillaume et al. | |
| 2010/0058053 A1 | 3/2010 | Wood et al. | |
| 2010/0287369 A1 | 11/2010 | Monden | |
| 2012/0226902 A1 | 9/2012 | Kim | |
| 2014/0044261 A1 | 2/2014 | Massimo | |

OTHER PUBLICATIONS

International Search Report and Written Opinion—PCT/US2015/034531—ISA/EPO—dated Apr. 4, 2016.

Menezes, et al., "Handbook of Applied Cryptography", 1997, CRC Press LLC, USA, XP001525013, pp. 543-590, p. 543-p. 590.

Menezes A.J., et al., "Chapter 8: Public-Key Encryption ED," Handbook of Applied Cryptography; [CRC Press Series on Discrete Mathematices and its Applications], CRC Press, Boca Raton, FL, US, pp. 283-319, Oct. 1, 1996 (Oct. 1, 1996), XP001525008, ISBN: 978-0-8493-8523-0 Retrieved from the Internet: URL:http://www.cacr.math.uwaterloo.ca/hac/ pp. 286-291.

Back A., et al., "Reducing vulnerability to private key compromise," 1998, pp. 6, Retrieved from the Internet <URL: http://www.cs.ucl.ac.uk/staff/l.Brown/pfs2.html>.

Stackoverflow: "What is the purpose of using separate key pairs for signing and encryption," Retrieved on Jul. 31, 2014, pp. 3, <URL: http://stackoverflow.com/questions/5133246/what-is-the-purpose-of-using-separate-key-pairs-for-signing-and-encryption>.

Chaum, David, "Blind Signatures for Untraceable Payments," pp. 6, Springer-Verlag, Department of Computer Science, University of California, Santa Barbara, CA, 1998.

Dodis, Yevgeniy, et al., "Fuzzy Extractors: How to Generate Strong Keys from Biometrics and Other Noisy Data," SIAM Journal on Computing, pp. 97-139, Jan. 20, 2008.

* cited by examiner

*Further Exemplary Procedures for use by a Cryptographic Device*

*Exemplary Procedures for use by a Cryptographic Device while Employing three or more Keypairs* 1300

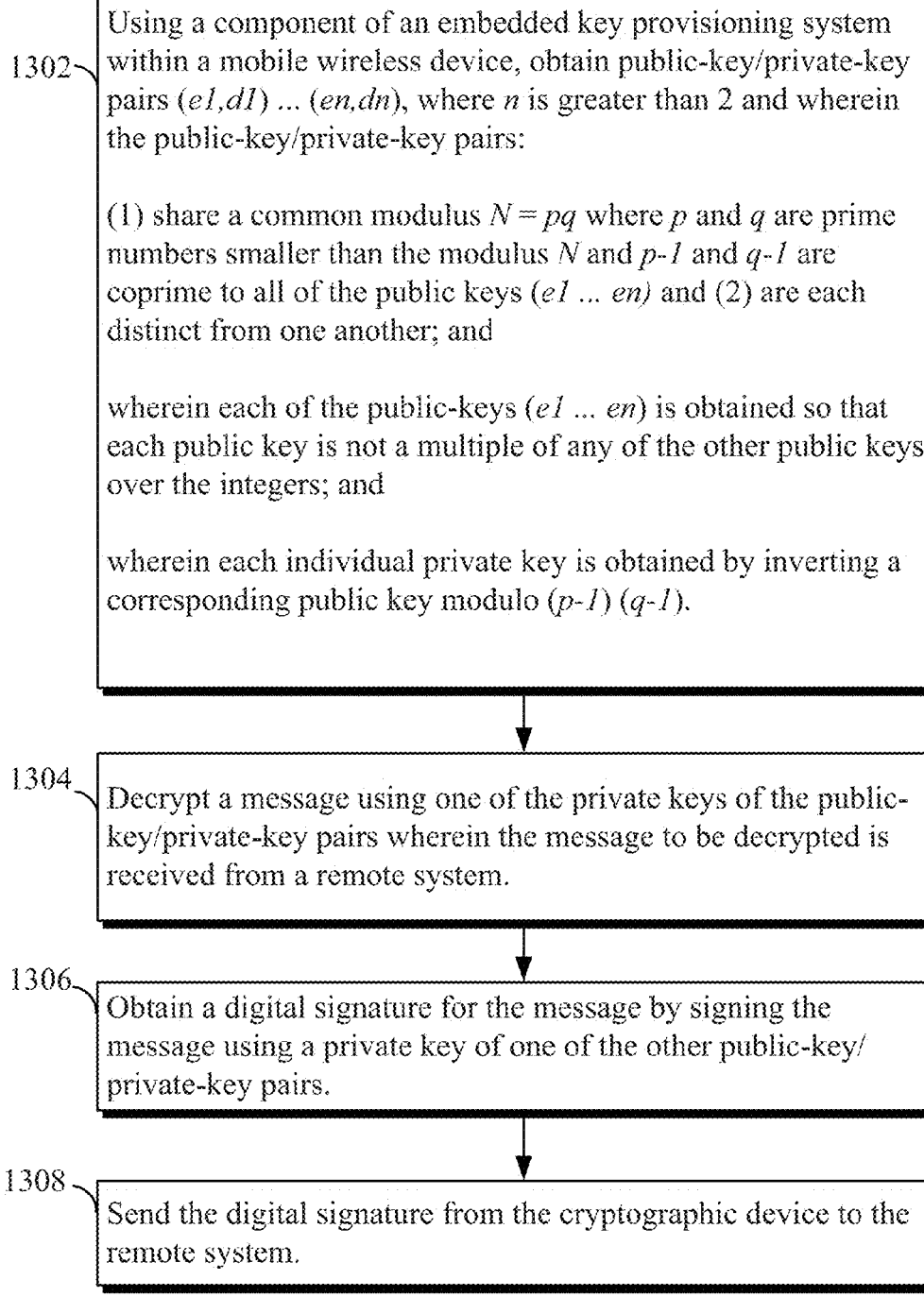

1302 — Using a component of an embedded key provisioning system within a mobile wireless device, obtain public-key/private-key pairs $(e1,d1) ... (en,dn)$, where $n$ is greater than 2 and wherein the public-key/private-key pairs:

(1) share a common modulus $N = pq$ where $p$ and $q$ are prime numbers smaller than the modulus $N$ and $p-1$ and $q-1$ are coprime to all of the public keys $(e1 ... en)$ and (2) are each distinct from one another; and wherein each of the public-keys $(e1 ... en)$ is obtained so that each public key is not a multiple of any of the other public keys over the integers; and wherein each individual private key is obtained by inverting a corresponding public key modulo $(p-1)(q-1)$.

1304 — Decrypt a message using one of the private keys of the public-key/private-key pairs wherein the message to be decrypted is received from a remote system.

1306 — Obtain a digital signature for the message by signing the message using a private key of one of the other public-key/private-key pairs.

1308 — Send the digital signature from the cryptographic device to the remote system.

*FIG. 13*

*Further Exemplary Procedures for use by a
System in Communication with a Cryptographic Device* 1700

1702 — Using a system in communication with an embedded system of a mobile wireless device, receive first and second public keys ($e1$, $e2$) of RSA public-key/private-key pairs ($e1,d1$), ($e2,d2$), wherein the first and second public-key/private-key pairs:

(1) share a common modulus $N = pq$ where $p$ and $q$ are prime numbers smaller than the modulus $N$ and $p-1$ and $q-1$ are coprime to both the first public key ($e1$) and the second public key ($e2$) and (2) are distinct from one another; and wherein the first and second public-keys ($e1$, $e2$) are such that the first public key ($e1$) is not a multiple of the second public key ($e2$) over the integers and/or the second public key ($e2$) is not a multiple of the first public key ($e1$) over the integers.

1704 — Encrypt a message using a public key ($e1$) and send to the embedded system of a mobile wireless device.

1706 — Receive a signed reply to the message from the embedded system of the mobile wireless device wherein the message has been signed with a signature obtained using the private key ($d2$) of the second public-key/private-key pair ($e2,d2$).

1708 — Verify the signature of the signed reply using the second public key ($e2$).

*FIG. 17*

*Exemplary Procedures for use by a System in Communication with a Cryptographic Device while Employing three or more Keypairs* 1800

1802 — Using a system in communication with of an embedded system of a mobile wireless device, receive three or more public keys ($e1$ ... $en$) of a set of public-key/private-key pairs ($e1,d1$) ... ($en,dn$), where $n$ is greater than 2 and wherein the public keys:

(1) share a common modulus $N = pq$ where $p$ and $q$ are prime numbers smaller than the modulus $N$ and $p-1$ and $q-1$ are coprime to all of the public keys ($e1$ ... $en$) and (2) wherein each of the public keys ($e1$ ... $en$) are distinct from one another; and wherein each of the public-keys ($e1$ ... $en$) is such that each public key is not a multiple of any of the other public keys over the integers.

1804 — Encrypt a message using one of the public keys and send to the embedded system of a mobile wireless device.

1806 — Receive a signed reply to the message from the embedded system of the mobile wireless device wherein the message has been signed with a signature obtained using a private key of the set of public-key/private-key pairs.

1808 — Verify the signature of the signed reply using a public key corresponding to the private key used to obtain the signature.

*FIG. 18*

COMMON MODULUS RSA KEY PAIRS FOR SIGNATURE GENERATION AND ENCRYPTION/DECRYPTION

CROSS-REFERENCE TO RELATED APPLICATIONS

This application claims priority based on U.S. Provisional Patent Application Ser. No. 62/010,400, filed Jun. 10, 2014, for "Common Modulus RSA Key Pairs for Signature Generation and Encryption/Decryption," which is assigned to the assignee hereof and incorporated by reference herein in its entirety.

BACKGROUND

Field of the Disclosure

Various features relate to encryption/decryption and digital signature generation, particularly asymmetric cryptography involving public and private keys.

Description of Related Art

Asymmetric cryptographic systems such as public key systems (also referred to as public-key/private-key systems) typically have advantages over other cryptographic systems in terms of key management and distribution. However, public key systems often may be computationally difficult and may involve large digital signatures. The key generation process may be computationally expensive. Accordingly, asymmetric cryptographic systems may require a powerful processor or may require additional processing time, which may cause delays, use more energy and/or drain batteries or other resources.

Furthermore, it is generally considered good cryptographic practice to have separate keys for different applications/protocols. In particular, if an asymmetric cryptographic system needs to receive encrypted messages and decrypt them, and also generate digital signatures, it is often advisable to have distinct keys for the two protocols. However, when using asymmetric cryptographic systems such as Rivest-Shamir-Adleman (RSA) systems, it is often too computationally expensive to generate two keys (e.g., in general twice as burdensome as generating just one key.) This can be especially problematic in embedded devices of key provisioning systems with limited resources, such as smartphones or the like. Note that herein, for brevity, the term key provisioning system generally refers to a system capable of generating and/or provisioning keys. It should be understood that, in practice, separate systems may be employed to generate the RSA keys while other systems provision the keys.

In view of the foregoing, it would be helpful to provide improved key generation and provisioning techniques and systems, particularly for use with embedded key provisioning systems.

SUMMARY

A method operational in a cryptographic device for decrypting and signing messages includes: obtaining first and second public-key/private-key pairs, wherein the first and second public-key/private-key pairs share a common modulus; decrypting a message using a private key of the first public-key/private-key pair; obtaining a digital signature for the message by signing the message using a private key of the second public-key/private-key pair; and sending the digital signature from the cryptographic device.

In another aspect, a device includes: a processing circuit configured to obtain first and second public-key/private-key pairs, wherein the first and second public-key/private-key pairs share a common modulus; decrypt a message using a private key of the first public-key/private-key pair; obtain a digital signature for the message by signing the message using a private key of the second public-key/private-key pair; and a transmitter device configured to send the digital signature from the cryptographic device.

In yet another aspect, a method operational in a system for encrypting and verifying messages includes: receiving first and second public keys of first and second public-key/private-key pairs from a separate device, wherein the first and second public-key/private-key pairs share a common modulus; encrypting a message using the first public key of the first and second public-key/private-key pairs that share the common modulus; sending the encrypted message to the separate device; receiving a signed reply to the message from the separate device, wherein the message has been signed with a signature obtained using a private key of the second public-key/private-key pair; and verifying the signature of the signed reply using the second public key of the first and second public-key/private-key pairs that share the common modulus.

In still yet another aspect, a device includes: a receiver device configured to receive first and second public keys of first and second public-key/private-key pairs from a separate device, wherein the first and second public-key/private-key pairs share a common modulus; a transmitter device; and a processing circuit configured to encrypt a message using the first public key of the first and second public-key/private-key pairs that share the common modulus; send the encrypted message to the separate device using the transmitter device; receive a signed reply to the message from the separate device using the receiver device, wherein the message has been signed with a signature obtained using a private key of the second public-key/private-key pair; and verify the signature of the signed reply using the second public key of the first and second public-key/private-key pairs that share the common modulus.

BRIEF DESCRIPTION OF THE DRAWINGS

FIG. 4 illustrates exemplary operations of an embedded cryptographic device and a remote server of a partner vendor and information exchanged there-between.

FIG. 6 illustrates exemplary software components of the embedded cryptographic device, software components of the remote server of a partner vendor and information exchanged there-between to facilitate initial communications and key exchange and the like.

FIG. 7 further illustrates exemplary software components of the embedded cryptographic device, software components of a remote server and information exchanged there-between to facilitate authentication challenges and the like.

FIG. 13 summarizes further exemplary procedures for use in decrypting and signing messages using three or more keypairs.

FIG. 17 summarizes further exemplary procedures for use in encrypting and verifying messages using, e.g., two keypairs.

FIG. 18 summarizes further exemplary procedures for use in encrypting and verifying messages using three or more keypairs.

DETAILED DESCRIPTION

Figure 1:
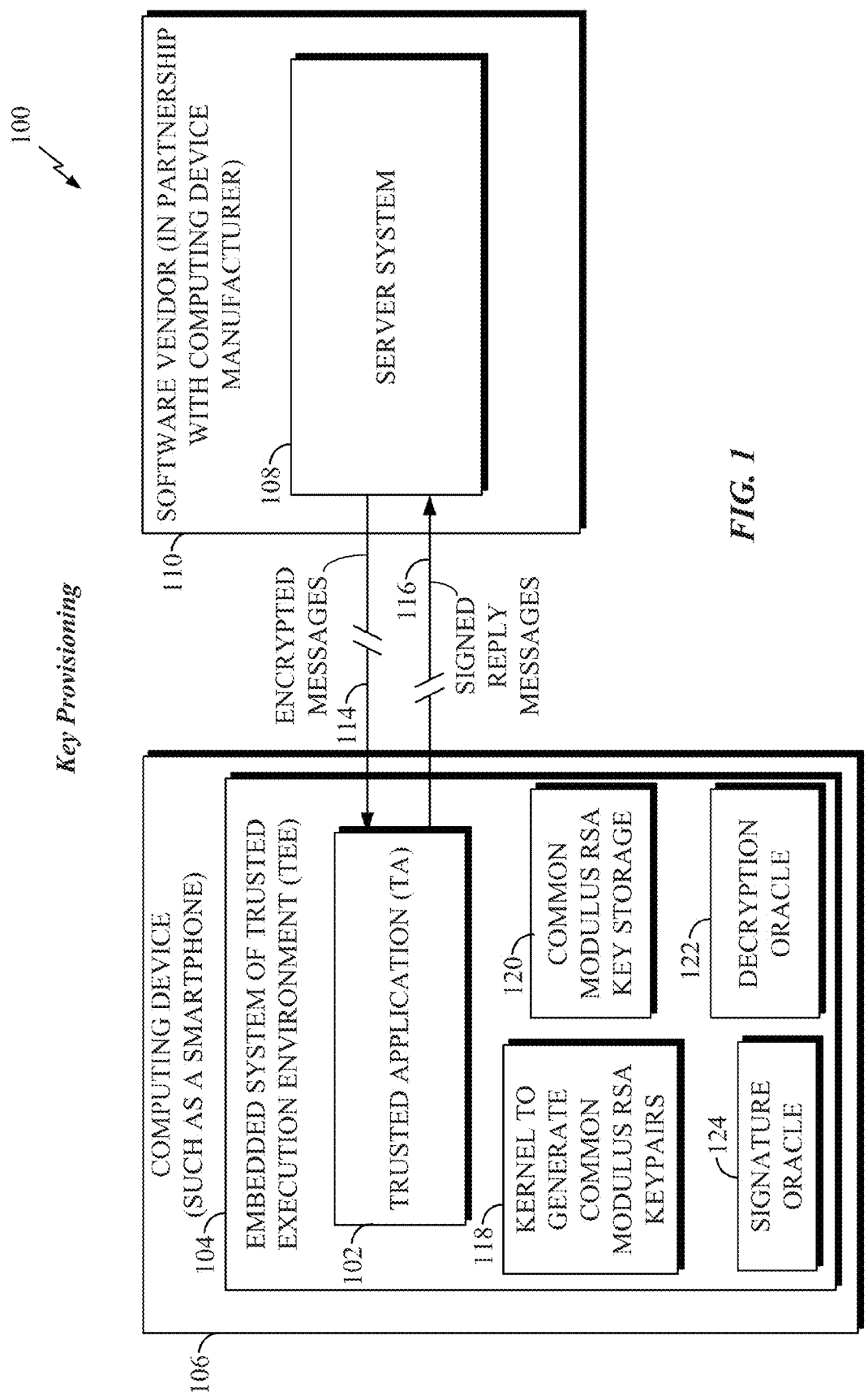
FIG. 1 illustrates exemplary key provisioning systems and methods wherein pairs of keys are generated that share a common modulus.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to devices and methods for use with embedded key provisioning systems, such as systems installed within smartphones for generating RSA public-key/private-key pairs for use in encryption/decryption and digital signature generation/verification. Briefly, in at least some examples, an embedded key provisioning system is provided that generates two public-key/private-key pairs—one for encryption/decryption and the other for signature generation/verification—wherein the two public-key/private-key pairs share a common modulus but are otherwise distinct or uncorrelated. This allows the two key pairs to be generated much more efficiently than if two entirely separate key pairs were generated, i.e. each one with its own distinct modulus, and yet, at least in the context of embedded key provisioning systems, satisfactory integrity and confidentiality is achieved. Herein, cryptographic systems and methods that generate two public-key/private-key pairs—one for encryption/decryption and the other for signature generation/verification—wherein the two public-key/private-key pairs share a common modulus but are otherwise distinct are broadly and generally referred to as "common modulus key provisioning systems/methods."

In this regard, the use of separate RSA public/private key pairs (e1,d1) and (e2,d2) to the same modulus (N=pq) obtained using the common modulus key provisioning systems/methods described herein is believed to provide a secure, sensible and performance-efficient solution for embedded key provision systems such as the Macchiato™ system of Qualcomm Incorporated. Moreover, to implement the common modulus key provisioning system requires relatively modest modifications to existing key provisioning systems. For example, during the generation of the primes p, q for use in generating keypairs, the system can check that p−1 and q−1 are coprime to both e1 and e2—instead of checking that they are coprime to just one public exponent (as would be the case if entirely separate RSA key pairs were generated). Thereafter, in at least some examples, the embedded system inverts e1 modulo (p−1)(q−1) to obtain d1 and inverts e2 modulo (p−1)(q−1) to obtain d2. Note that, by distinct or uncorrelated, it is meant that neither of e1, e2 is a multiple of the other or, depending on the application, that e1 is not a multiple of e2 or e2 is not a multiple of e1, where e1 and e2 refer to public keys.

Traditionally, there are two main reasons for providing entirely separate keys for encryption/decryption and for signing: security and key management. Insofar as security is concerned, two general types of attacks are of concern: a) loss of integrity on a signature scheme due to issues with the decryption oracle; and b) loss of confidentiality on an encryption scheme due to issues with the signature oracle. However, in the context of embedded key provisioning systems, these vulnerabilities are not believed to present a problem when using the common modulus key provisioning systems/methods described herein. For example, loss of integrity should not be a problem if all encrypted messages are signed with a distinct manufacturer key (provided by the manufacturer of the embedded system) that chains back to a certificate in the embedded device. It is unlikely that an attacker would have access to the decryption oracle of the embedded device as it would be implemented within a trusted execution environment of the device, or the device itself may be tamper proof Insofar as loss of confidentiality on the encryption scheme owing to the signature oracle is concerned, an attacker would likely need to be able to use the signature oracle to decrypt a message and then leak the output. This appears to be very low risk, at least within embedded systems, because different padding can be used for the purposes of encryption and signing. Any padding generation or verification, hashing, and signing is done inside the operating kernel of the Trusted Execution Environment (short TEE; for instance, a TrustZone Operating Environment (TZBSP) in the case of TrustZone), and not in the application using these services, such as a Trusted Application (TA.) (Note that in public key cryptography, padding refers to a process for preparing a message for encryption or signing using a scheme such as optimal asymmetric encryption padding (OAEP), Public-Key Cryptography Standards #1 (PKCS#1) v1.5, Probabilistic Signature Scheme (PSS), PSS with Recovery (PSSR), Institute of Electrical and Electronics Engineers (IEEE) P1363, Encoding Method for Signature with Appendix (EMSA2 or EMSA5.) Therefore the attacker would likely need to: compromise a TA application; call into the kernel routines of the TEE at "wrong" addresses or with wrong parameters so as to pass a message as a signature and decrypt it; then output the result as well. Although not impossible, this is believed to be quite difficult and hence this form of attack is likewise believed to be low risk.

Turning now to key management, in most systems signature and encryption keys have different requirements, e.g., in terms of backup, access, escrow, repudiation, etc. Typically a signature key must be destroyed in case it is compromised, but an encryption key usually must be kept to decrypt older messages. They may have different life spans by policy or by regulation. These concerns however generally do not apply to embedded devices, particularly for use in smartphones and the like, because the life span of such devices is typically much shorter than all key lifecycles. Moreover, generic methods to reveal the factorization of one modulus would most likely also be used to reveal the factorization of two moduli. That is, if the common modulus key provisioning systems/methods described herein are vulnerable by means of methods that reveal the factorization of the modulus, the pairs of keys would most likely also be vulnerable if generated separately using otherwise conventional techniques. For example, an unexpected mathematical breakthrough in factorization techniques could render both types of systems vulnerable, but such a breakthrough would likely render non-common modulus techniques vulnerable as well.

It is believed that using two "mathematically uncorrelated" exponent pairs (i.e. distinct exponent pairs) with a single modulus is sufficient to address the above concerns. Consider an example of an RSA modulus N=pq and two public/private key pairs (e1, d1) and (e2, d2). The first keypair is to be used for encryption only; whereas the second is to be used for signing purposes exclusively. Consider that a message $c=m^{e1}$ arrives encrypted with e1 and a hacker has a decryption oracle for (e2, d2), which can be an exploitable decryption oracle or an exploitable signature oracle. Then the attacker is generally limited to computing $c^{d2}=m^{(e1d2)}=m^{(e1/e2 \mod \varphi(N))}$ and the relation to the original message can then only be computed if the relation e1/e2 mod $\varphi(N)$) can be determined where $\varphi$ refers to the Euler function or Euler totient function. (Note that the value of the function $\varphi(N)$ is unknown to an attacker.) This is generally equivalent to computing an RSA problem, as long as the mathematical relation between e1 and e2 is not an obvious one. For instance, e1 (resp. e2) should not be a multiple of e2 (resp. e1) modulo $\varphi(N)$. Since the latter cannot be known by an attacker (lest the attacker can factorize RSA moduli), this amounts to: e1 (resp. e2) should not be a power of e2 (resp. e1) as integers. Using for e1 and e2 two small primes (small w.r.t. the modulus) is therefore more than sufficient in most practical cases. See, for example, techniques described in *Chaum,* "Blind Signatures for Untraceable Payments." Advances in Cryptology Proceedings of Crypto 82 (3): 199-203 (1983.)

In at least some examples, a Trusted Application (TA) runs in a Trusted Execution Environment (TEE) on a device (mobile device, computer, etc.) where the TA needs to authenticate itself to a server. To do this a RSA key pair (or a pair of key pairs with common modulus) is generated in the kernel of the TEE and kept there: the TA does not have access to these keys and typically must call into the kernel to get cryptographic operations done. The messages sent from the TA to the server are either in clear or are encrypted for the server (so the encryption may use a key of the server, which has nothing to do with the RSA keys). The messages from the server to the TA are encrypted with a device's key. The usual two situations are: a single RSA key (one modulus, one single public/private exponent pair) for both encryption and signing; or two completely distinct RSA keys (each with its own modulus and single public/private exponent pair). The RSA key generation is fundamental to create a device-unique set of keys that is then used by a server to encrypt some data for the device, data that is TA specific. The key provisioning is the act of bringing data from the server to the TA. To save time—and exploiting the fact that there are no external policies on these keys—the embedded devices described herein generate one modulus N and two different public/private exponent pairs (e1,d1) and (e2,d2), the first pair is used for encrypting messages to the device (using e1) and decrypting them on the device (using d1)—the second pair is used to sign messages on the device (using d2) and to allow external parties to verify the signature (using e2). With the usual meaning of d,e in the RSA literature, d1,d2 are the secret exponents and e1,e2 are the public ones.

In at least some examples, key generation operates as follows: generate two distinct random prime numbers p,q (for instance using a pseudorandom number generator (PRNG) to generate numbers, and testing whether they are primes); compute N=pq, t=(p−1)(q−1)=$\varphi(N)$; verify whether the chosen public exponents e1, e2 are coprime to t. If they are not, start over; if e1, e2 are coprime to t, let d1, resp d2 be the modular inverses of e1, e2 modulo t; and verify whether some random value x raised to the power of t is x itself If not start over; otherwise the embedded device has successfully generated a key.

Insofar as the uncorrelated public exponents are concerned, the following considerations apply. The numbers should be distinct, otherwise the scheme would be reduced to the classical RSA scheme. One should not be a multiple of the other. If e2=k e1, then d1=k d2 (modulo $\varphi(N)$) and if an attacker intercepts a message encrypted by the server (by raising it to the e1-th power), and the attacker has access to a decryption oracle for d2 (for instance an exploited signature oracle on the device, that can leak the result of the operation—as it should, as it is a signing device), then the attacker could use the decryption oracle to raise the intercepted message to the power of d2, thus decrypting the message (because k is known, as it is the trivial factor between e1 and e2). An important consideration is that, as integers, e2 should not be a multiple of e1 (and vice versa, for the case that one intends to compromise the signature scheme using a decryption oracle—for this case e1 should not be a multiple of e2). If the ratios e1/e2 and e2/e1 are not integers, then breaking the system requires solving a RSA problem (which is believed to be equivalent to factoring.)

Note that modulo $\varphi(N)$ e1 is always a multiple of e2 (and vice versa) but since the attacker cannot compute $\varphi(N)$ (this "impossibility" is a standard RSA security assumption), the attacker cannot determine the factor—so the multiplicative relation that must be prevented holds by necessity over the integers, and not integers modulo $\varphi(N)$. Using the same modulus and separating the exponent pairs as above makes it substantially impossible to use the signing oracle to decrypt messages for an attacker. It achieves the cryptographic principle of key separation while reducing computational complexity at key generation and reduces bandwidth in sharing the keys as well. The technique may thereby be useful for improving single sign-on systems using one key and may have many other applications as well. Insofar as the public exponents are concerned: RSA systems only require these exponents to be odd numbers smaller than N (and coprime to φ(N), but this is tested at key generation). In practice, there is no actual limitation. Systems often use numbers like 3, 5, 17, 257, 65537 for performance reasons but others may be used instead. Note also that, although described with respect to RSA examples, at least some of the techniques described herein are applicable to other cryptographic techniques, such as multi-prime RSA or other RSA-like key pairs. By RSA-like, it is meant that, for instance, moduli are used that are the products of more than two primes (so the modulus N would be $N=p_1*p_2* \ldots *p_r$, where the $p_i$ for $i=1, 2, \ldots, r$ are all primes, and e1,e2 should be coprime to each of the $p_i-1$ for $i=1, 2, \ldots, r$ and $\varphi(N)=(p_1-1)*(p_2-1)* \ldots *(p_r-1)$.) Accordingly, aspects of this disclosure are applicable to multi-prime (R>2) moduli. In such cases, key generation would check whether e1,e2 are coprime to each of the $p_i-1$ for $i=1, 2, \ldots, r$ instead of just coprime to (p−1) and (q−1).

Moreover, although many of the illustrative examples described herein employ two keypairs that share a common modulus, the techniques are applicable to the generation and use of three or more keypairs that share a common modulus. For example, four keypairs can be generated, two for encryption/decryption (e1,d1; e3,d3) and two for signing/verifying (e2,d2; e4,d4), where each of the four public keys (e1, e2, e3, e4) satisfy the general condition that each is not divisible by the others (over the integers.) In general any number of keypairs may be generated for encryption/decryption and any number of keypairs may be generated for signing/verifying, with at least one key pair per type (where all satisfy the condition that the public exponents of the keypairs cannot divide each other (over the integers.)) Furthermore, although the examples herein primarily involve RSA or RSA-like keypairs, at least some aspects of the disclosure are applicable to other cryptography schemes or protocols, such as those that use higher algebraic structures or multivariate systems (i.e. systems using asymmetric cryptographic primitives based on multivariate polynomials over finite fields.) In general, however, the techniques described herein are not expected to be applicable to elliptic curve cryptography (ECC) or to any cryptographic system based on non-commutative mathematical structures.

Exemplary Hardware Environment

The common modulus embedded key provisioning systems/methods described herein can be exploited in a wide range of devices and for a wide range of applications. FIG. 1 illustrates a typical application where one end point of an overall system 100 is a trusted application (TA) 102 running on an embedded system or device 104 of a trusted execution environment (TEE) of a smartphone or other computing device 106; whereas the other endpoint is a server system 108 of a software vendor 110 (typically in partnership with the manufacturer of the smartphone or other computing device.) In such applications, the TA 102 of the embedded system typically needs to be equipped to decrypt various encrypted messages 114 received from the partner server and to also sign reply messages 116 for sending back to the server system 108. The aforementioned kernel 118 for generating the common-modulus RSA keypairs and a storage device 120 for storing the keypairs are also shown, along with a decryption oracle 122 and a signature oracle 124, which are all part of the TEE embedded system 104 but separate from the TA 102.

In general, the common modulus systems/methods described herein are broadly useful in any circumstance where a device needs to be capable of generating public-key/private-key pairs and also needs to sign messages (wherein the modulus can be kept confidential.) To provide a concrete example, an exemplary hardware environment will now be described where an embedded key provisioning component is provided on a SoC processing circuit for use in a smartphone mobile communication device or other access terminal. Other exemplary hardware environments in which the embedded key provisioning systems/methods may be implemented include other communication devices and components or peripheral devices for use therewith, etc., as well as traditional desktop computers and transaction servers connected to the Internet.

Figure 2:
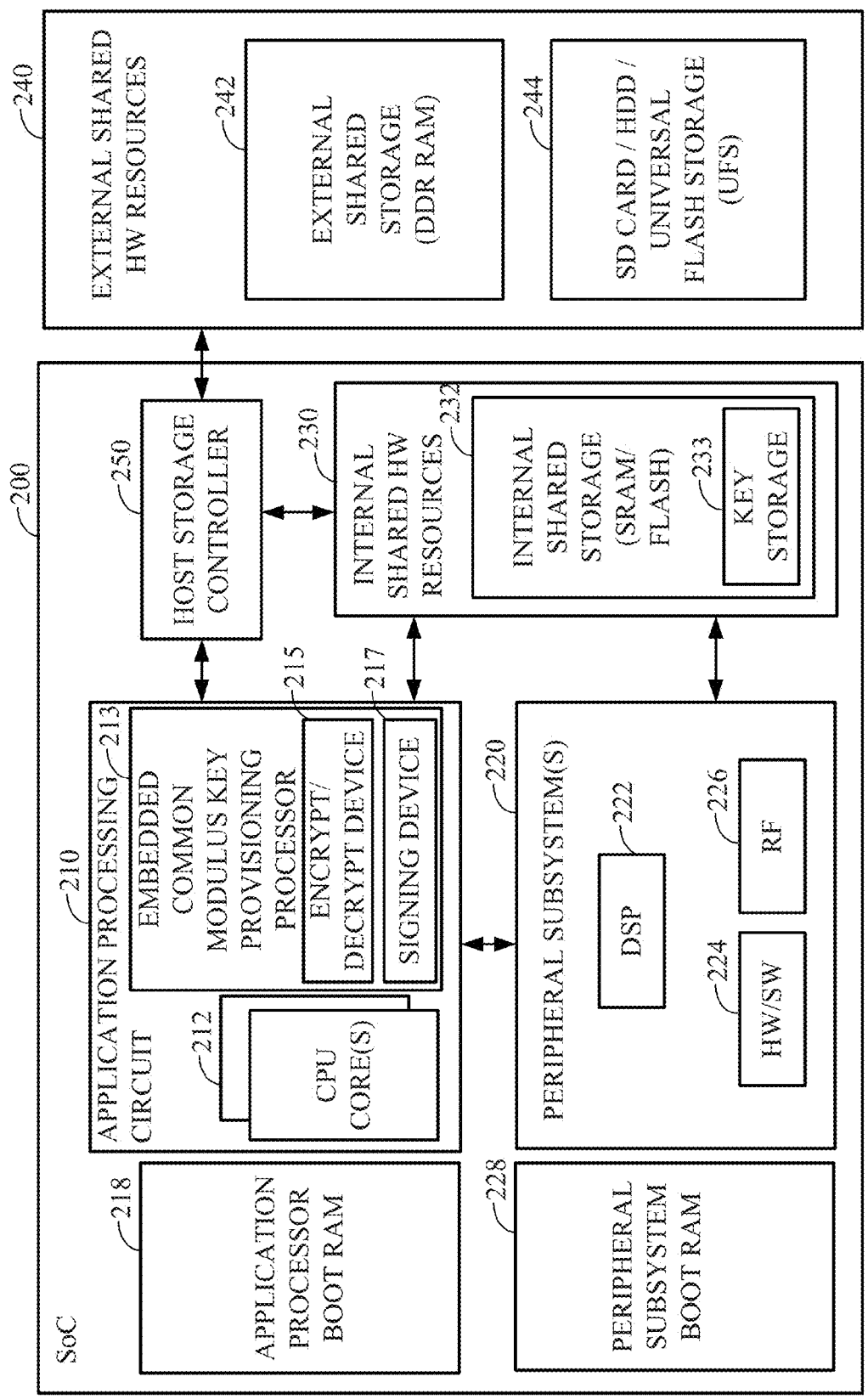
FIG. 2 illustrates an exemplary system-on-a-chip (SoC) of a mobile device wherein the SoC includes an embedded common modulus key provisioning processor for signature generation and for encryption/decryption.

FIG. 2 illustrates a SoC processing circuit 200 of a mobile communication device in accordance with one example where various novel features may be exploited. The SoC processing circuit may be a Snapdragon™ processing circuit of Qualcomm Incorporated. The SoC processing circuit 200 includes an application processing circuit 210, which includes a multi-core CPU 212 equipped to operate in conjunction with an embedded common modulus key provisioning processor 213 having an encryption/decryption device 215 and a digital signature signing device 217 (which may include both signing and verification components.) The encryption/decryption device 215 may be used for encrypting and/or decrypting messages using one keypair of a pair of keypairs obtained based on a common modulus. The signing device 217 may be used for signing and/or verifying messages using the other keypair of the pair of keypairs obtained based on the common modulus. The messages themselves may be sent/received to/from remote systems (such as the vendor server of FIG. 1) via wireless communication networks and other networks. In the example of FIG. 2, the key provisioning processor 213 is capable of both generating and provisioning keys. In practical applications, separate systems may be employed to generate RSA keys while other systems provision the keys. Note also that, in many practical applications, the embedded device only decrypts messages received from an external server; it does not encrypt messages. Both encryption and decryption components are shown for the sake of completeness and generality. Signing device 217 can also, in some examples, verify signatures.

The application processing circuit 210 typically controls the operation of all components of the mobile communication device. In one aspect, the application processing circuit 210 is coupled to a host storage controller 250 for controlling storage of data, including storage of public and private keys in a key storage element 233 of an internal shared storage 232 that forms part of internal shared hardware (HW) resources 230. The application processing circuit 210 may also include a boot ROM or RAM 218 that stores boot sequence instructions for the various components of the SoC processing circuit 200. The SoC processing circuit 200 further includes one or more peripheral subsystems 220 controlled by application processing circuit 210. The peripheral subsystems 220 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., other encryption components and digital rights management (DRM) components), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 2G Long Term Evolution (LTE) modems). The exemplary peripheral subsystem 220, which is a modem subsystem, includes a DSP 222, various other hardware (HW) and software (SW) components 224, and various radio-frequency (RF) components 226. In one aspect, each peripheral subsystem 220 also includes a boot ROM or RAM 228 that stores a primary boot image (not shown) of the associated peripheral subsystems 220.

As noted, the SoC processing circuit 200 further includes various internal shared HW resources 230, such as an internal shared storage 232 (e.g. static RAM (SRAM), flash memory, etc.), which is shared by the application processing circuit 210 and the various peripheral subsystems 220 to store various runtime data or other parameters and to provide host memory. In the example of FIG. 2, the internal shared storage 232 includes the aforementioned key storage portion, component or element 233 that may be used to store public and private keys. In other examples, keys are stored elsewhere within the mobile device.

In one aspect, the components 210, 218, 220, 228 and 230 of the SoC processing circuit 200 are integrated on a single-chip substrate. The SoC processing circuit 200 further includes various external shared HW resources 240, which may be located on a different chip substrate and may communicate with the SoC processing circuit 200 via one or more buses. External shared HW resources 240 may include, for example, an external shared storage 242 (e.g. double-data rate (DDR) dynamic RAM) and/or permanent or semi-permanent data storage 244 (e.g., a secure digital (SD) card, hard disk drive (HDD), an embedded multimedia card, a universal flash device (UFS), etc.), which may be shared by the application processing circuit 210 and the various peripheral subsystems 220 to store various types of data, such as an operating system (OS) information, system files, programs, applications, user data, audio/video files, etc. When the mobile communication device incorporating the SoC processing circuit 200 is activated, the SoC processing circuit begins a system boot up process in which the application processing circuit 210 may access boot ROM or RAM 218 to retrieve boot instructions for the SoC processing circuit 200, including boot sequence instructions for the various peripheral subsystems 220. The peripheral subsystems 220 may also have additional peripheral boot ROM or RAM 228.

Exemplary Common Modulus Key Generation/Processing Procedures

Figure 3:
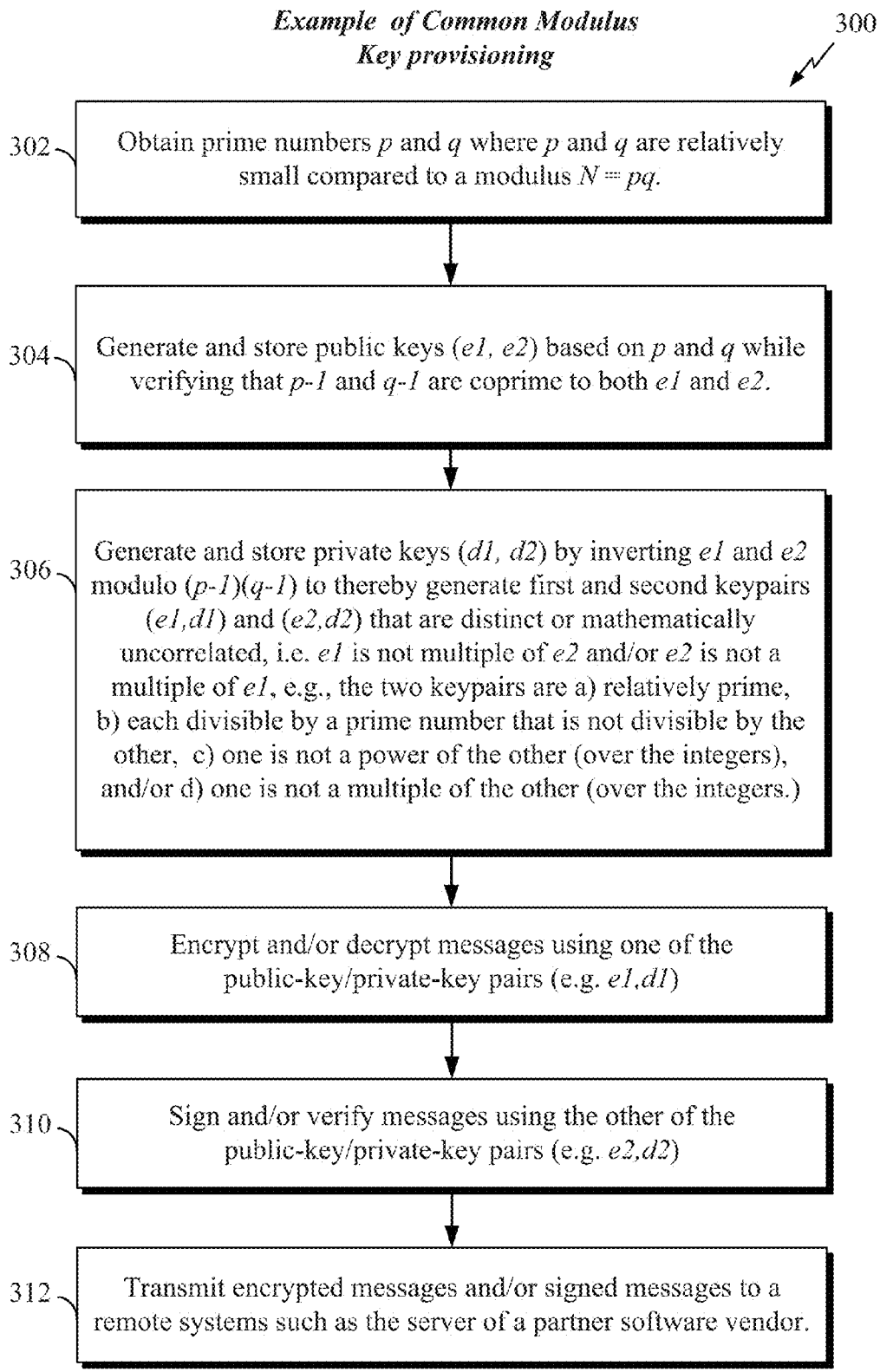
FIG. 3 illustrates an exemplary procedure for common modulus key provisioning.

FIG. 3 illustrates an example 300 of common modulus key provisioning that may be employed by the embedded key provisioning processor of FIG. 2, or other suitable-equipped components, devices, systems or processing circuits. At 302, the key provisioning processor obtains prime numbers p and q and uses them to compute the modulus N=pq. Typically, the primes are on the order of 1024 to 2048 bits or so in length. At 304, the key provisioning processor generates and stores public keys (e1, e2) based on p and q while verifying that p−1 and q−1 are coprime to both e1 and e2. At 306, the key provisioning processor generates and stores private keys (d1, d2) by inverting e1 modulo (p−1)(q−1) and e2 modulo (p−1)(q−1) to thereby generate first and second keypairs (e1,d1) and (e2,d2) that are mathematically distinct or uncorrelated. That is, the keypairs are mathematically distant from one another. As noted above, by distinct or uncorrelated, it is meant that neither of e1, e2 is a multiple of the other or, depending on the application, that e1 is not a multiple of e2 or e2 is not a multiple of e1. Note that using only one condition protects against some scenarios, using both protects against more scenarios or all relevant ones. As examples, the two keypairs can be a) relatively prime, b) each divisible by a prime number that is not divisible by the other, c) one is not a power of the other (over the integers) and/or, more generally, d) one is not a multiple of the other (over the integers.) That is, the first and second public-keys (e1, e2) can be obtained so that the first public key (e1) is not a multiple of the second public key (e2) over the integers and/or the second public key (e2) is not a multiple of the first public key (e1) over the integers. At 308, the key provisioning processor encrypts and/or decrypts messages using one of the public-key/private-key pairs (e.g. e1, d1). As already noted, in many practical applications, the embedded device of the smartphone only decrypts messages received from an external server; it does not encrypt messages. Both procedures are shown for the sake of generality. At 310, the key provisioning processor signs and/or verifies messages using the other of the public-key/private-key pairs (e.g. e2, d2). At 312, the key provisioning processor transmits encrypted messages and/or signed messages to a remote system such as the server of a partner software vendor.

Figure 4:
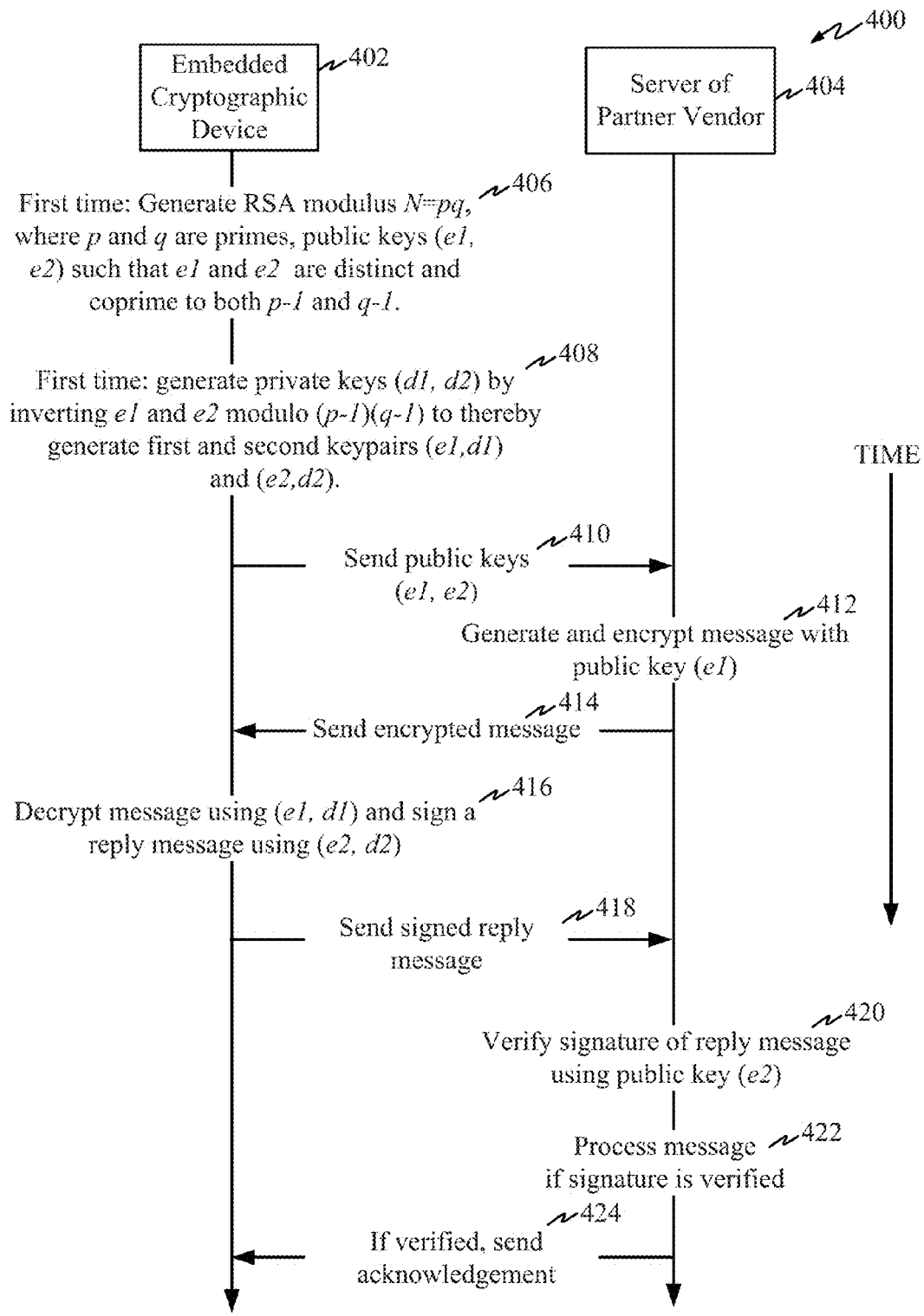

FIG. 4 provides a timing diagram 400 illustrating exemplary operations of an embedded cryptographic device 402 and remote sever 404 of a partner vendor. In this example, processing begins at 406 where the embedded cryptographic device generates RSA modulus N=pq, where p and q are primes, public keys (e1, e2) such that e1 and e2 are distinct and coprime to both p−1 and q−1, as already discussed. At 408, the embedded cryptographic device generates private keys (d1, d2) by inverting e1 and e2 modulo (p−1)(q−1) to thereby generate first and second keypairs (e1,d1) and (e2,d2), also as already discussed. Typically, the operations of 406 and 408 are performed only once per device. The remaining operations of FIG. 4 (i.e. 410 and following) can be repeated many times and are usually performed one or more times for each partner vendor, i.e. once for each TA to be run in the TEE of the device (and a particular vendor may have more than one TA within the device.) That is, 406 and 408 are performed only the first time the device runs the protocol, whereas the remaining steps are performed for each first connection to a partner vendor. At 410, the embedded cryptographic device sends the public keys (e1, e2) to the remote sever, which responds by generating and encrypting a message with the first of the public keys (e1) at 412. This message may include a challenge. At 414, the encrypted message is sent to the embedded cryptographic device, which decrypts the message using (e1, d1) at 416 and signs a reply message using (e2, d2). Note that if the message received at 416 contains a challenge, the cryptographic device computes a response using an application specific method. At 418, the signed reply message is sent to the remote server, which verifies the signature of the reply message using public key (e2), at 420. At 422, the remote server then processes the message and, if the signature is verified, the server sends an acknowledgement, at 424. That is, if all verifications are ok, an acknowledgement is sent. This acknowledgement may contain data to be provisioned (securely stored) to the device, encrypted using the device's public key (e1).

As noted, the message 412 can contain a challenge (i.e. a random number). This message may or may not be signed by the server using a server-own key that is itself chained to a public certificate that is stored in the device. By this method, the device knows it obtains an authentic message from the server. Then the device replies. If the message 412 contains a challenge, then the signed reply message 418 can contain the response to this challenge. It is not necessary that this message be encrypted with a server key, but such is possible.

It is important to note, however, that the message contains the original challenge or a response and the message is signed (whereby the signature can play the role of a proper response, since it can be done only by the device and the server can verify it.) At this point, the acknowledgement of 424 may also contain data that may contain the actual key that is provisioned to the device by the server. This key is application specific, and any further communication between server and the target TA in the device uses this new information.

Figure 5:
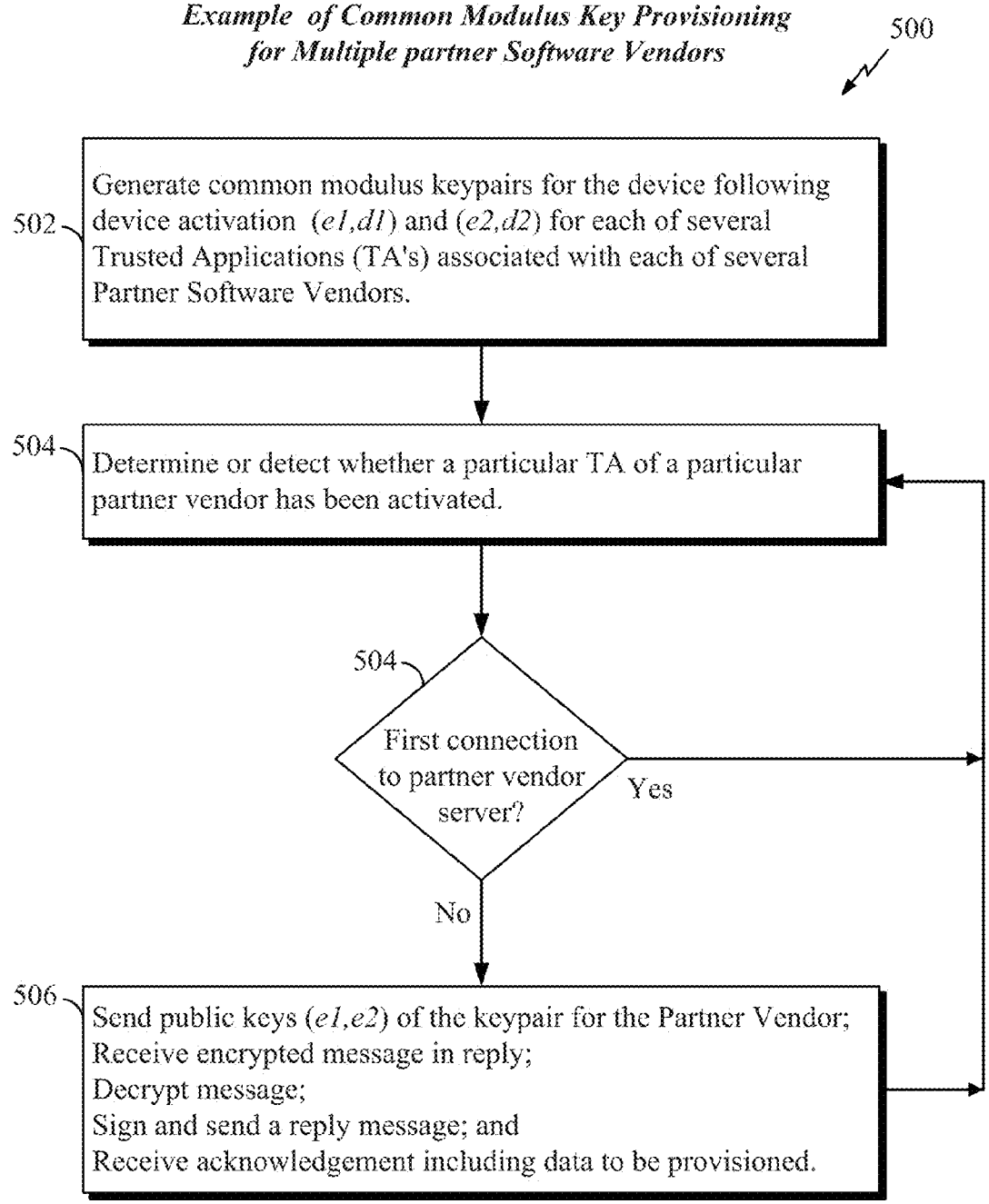
FIG. 5 illustrates an exemplary procedure for common modulus key provisioning for use with multiple partner software vendors.

FIG. 5 summaries the manner by which a smartphone or other user device registers various TA's with various partner vendors. Smartphones are often installed with several TA's associated with each of several partner software vendors. Beginning at 502, the user device generates common modulus keypairs for the device following device activation (e1,d1) and (e2,d2) for each of several TA's of each of several partner software vendors. (This can correspond to blocks 406 and 408 of FIG. 4.) At 504, the user device determines or detects whether a particular TA of a particular partner vendor has been activated and then determines, at 504, whether or not this is a first connection (i.e. whether or not the TA has already registered with the partner vendor.) If this is a first connection, the user device: sends public keys (e1,e2) of the keypair for the Partner Vendor; receives encrypted message in reply; decrypts the message; signs and sends a reply message; and receives an acknowledgement including data to be provisioned. (This can correspond to blocks 410-424 of FIG. 4.) Processing returns to 504 for additional TA's. Eventually, all of the TA's associated with all of the partner vendors are registered in this manner using various common modulus keypairs. In some cases, a particular TA for a particular vendor may need to re-register and, if so, the operations of block 506 are repeated for that TA. In rare cases, new common modulus keypairs may also need to be generated for use with a particular TA or for a particular vendor and, if so, the operations of block 502 are repeated for that TA and/or for that vendor.

Figure 6:
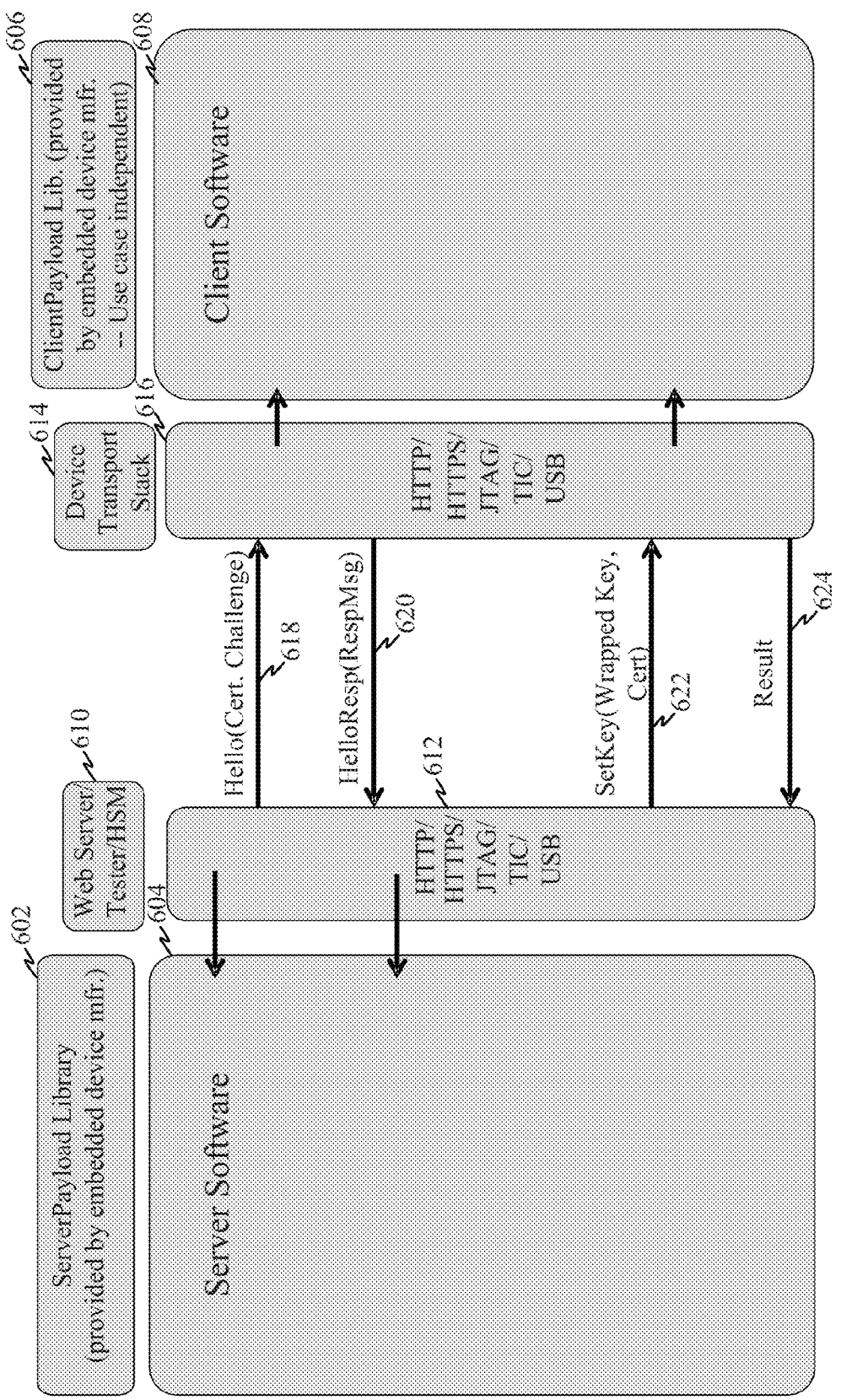

FIG. 6 illustrates exemplary software components for use with the embedded common modulus key provisioning procedures described herein to, e.g., facilitate initial communication hellos, handshakes, etc. A server payload library 602 is provided by the manufacturer of the embedded key provisioning device (e.g. the manufacturer of a smartphone in which components of the embedded key provisioning device are installed.) The server payload library 602 may include software components 604 equipped to perform various functions. A client payload library 606 is also provided by the manufacturer of the embedded key provisioning device for installation on the remote server of the partner vendor (such as server system 108 of FIG. 1.) The client payload library 606 may include software components 608 equipped to perform various functions. In use, the server payload library 602 communicates with the client payload library 606 via a webserver/tester/hardware security module (HSM) 610, which may use communication components/protocols 612 such as HTTP, HTTPS, JTAG, TIC or USB. Likewise, the client payload library 606 communicates with the server payload library 602 via a device transport stack 614, which may use the same protocols 616. (Note that HTTP stands for Hypertext Transfer Protocol, JTAG stands for Joint Test Action Group, TIC stands for Technologies de l'information et de la Communication, and USB stands for Universal Serial Bus.) Exemplary messages that may be communicated between the two libraries in this example include a Hello(certificate, challenge) message 618, a HelloResp(ReponseMsg) message 620, a SetKey(Wrapped Key, Certificate) message 622 and a Result message 624. The details of these messages are not important for the purposes of this disclosure but are provided merely as examples.

In an illustrative example, the client payload library 606 may include software components 608 equipped to handle the hello function using a certificate and a challenge. This may be performed, for example, by chaining the certificate to an embedded root, generating an encrypted device public key (DPK_EK), generating an encrypted chip ID, generating a challenge response and performing an RSA encryption of the encrypted device public key (DPK_EK), the chip ID and the challenge response. The client payload library 606 may also include software components equipped to set the wrapped key (SetKey) with the certificate by chaining the certificate to the embedded root, verify a challenge and response, generate the device public key (DPK) and unwrap the key and any metadata provided therewith.

In the illustrative example, the server payload library 602 may include software components 604 equipped to generate a challenge using a cryptographic quality random number generator (RNG) or PRNG. The server payload library 602 may also include software components equipped to wrap a service key based on the response message (ResponseMsg), a private key, a service key and some metadata. For example, the software may employ RSA to decrypt the response message received from the client payload library 606 using the private key and then extract an encrypted chip ID, an encrypted device public key (DPK_EK) and the response. The software then verifies the challenge response and performs a database lookup using the encrypted chip ID. The software decrypts the database record using device public key (DPK_EK), verifies a hash of the database record, extracts the device public key (DPK), a key wrap service key and the metadata. Again, these are just illustrative examples of software functions that might be performed while exploiting common modulus keypairs.

Figure 7:
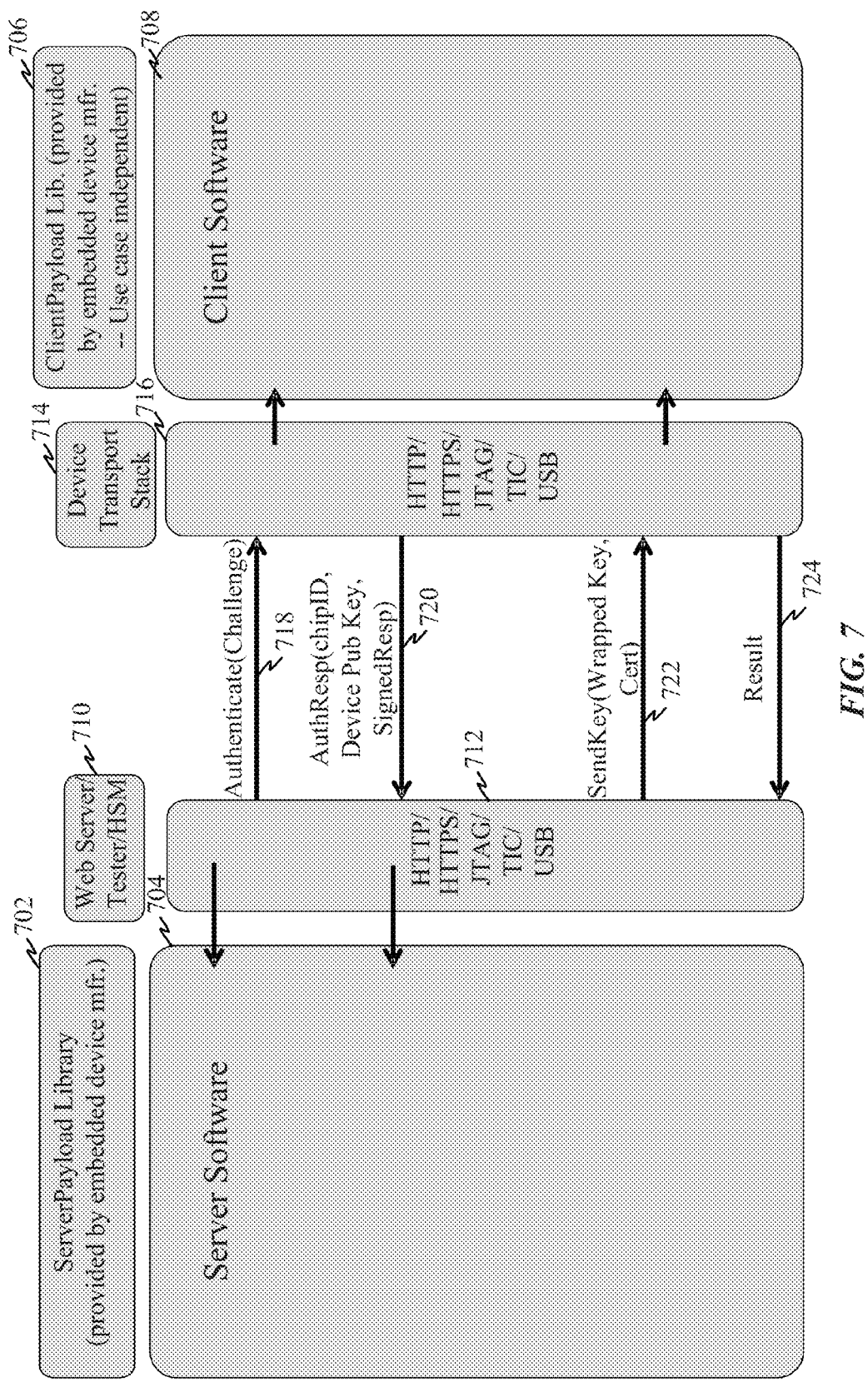

FIG. 7 further illustrates the exemplary software components, particularly involved in authentication challenge and response. A server payload library 702 is provided by the manufacturer of the embedded key provisioning device that may include software components 704 equipped to perform various functions. A client payload library 706 may include software components 708 equipped to perform the various functions. In use, the server payload library 702 again communicates with the client payload library 706 via a webserver/tester/HSM 710, which may use communication components/protocols 712 such as HTTP, HTTPS, JTAG, TIC and USB. Likewise, the client payload library 706 communicates with the server payload library 702 via a device transport stack 714, which may use the same protocols 716. Exemplary messages that may be communicated between the two libraries in this example include an authentication(challenge) message 718, an AuthResp (Chip ID, Device Pub Key, Signed Resp) message 720, a SendKey (Wrapped Key, Certificate) message 722 and a Result message 724. These messages and those of FIG. 7 facilitate the exchange of public keys, etc.

In an illustrative example, the server payload library 702 may include software components 704 equipped to generate the aforementioned challenge using a cryptographic quality RNG or PRNG. The software also includes components operative to authenticate the device using the chip ID, a database seed, a set of approved TA hashes, a signed response and a device public key. For example, the software may generate the hash for authentication using the device public key, the chip ID, and the database seed, then verify device public key (based on a database lookup using the hash. The software may also use RSA to verify the response using a public key for the SoC (such as SoC processing circuit 200 of FIG. 2), then also verify the challenge and, optionally, verify the TA hash against a supplier approved list, and finally return "opaque" data to caller. The software also includes components operative to wrap the service key using a somewhat different set of parameters than those listed above in connection with FIG. 6. For example, the software of FIG. 7 may perform the wrap service key function using: the chip ID, the database seed, the signed response, the device public key, a private key (KPSP), a service key and some key metadata. This may be achieved by authenticating the device, then using then the RNG to generate an AES256 wrapping key. A key wrap is performed using the service key and the key metadata. The wrapping key is encrypted using the SoC public key. Still further, the wrap service key function can sign the wrapped service key, the wrapping key, the response and the TA hashes using KPSP private key.

In the illustrative example, the client payload library 706 may include software components 708 equipped to respond to an authentication challenge. If the RSA device keypair is not present, the software generates a key pair using a bare public key (BPK) derivative and stores the key pair. The software then generates a response to the challenge by signing the challenge, the response, the TA hash (of a calling TA) and the opaque data. The software may also unwrap a service key and a certificate by chaining the certificate to an embedded device root, then verifying the signature over the wrapped key. The software can use the SoC private key to decrypt the wrapping key, then unwrap the service key and any metadata provided therewith. A calling TA can be verified using TA hashes and, if verified, the service key and metadata are returned to the caller. Again, these are just illustrative examples of software functions.

Exemplary Systems and Methods

Figure 8:
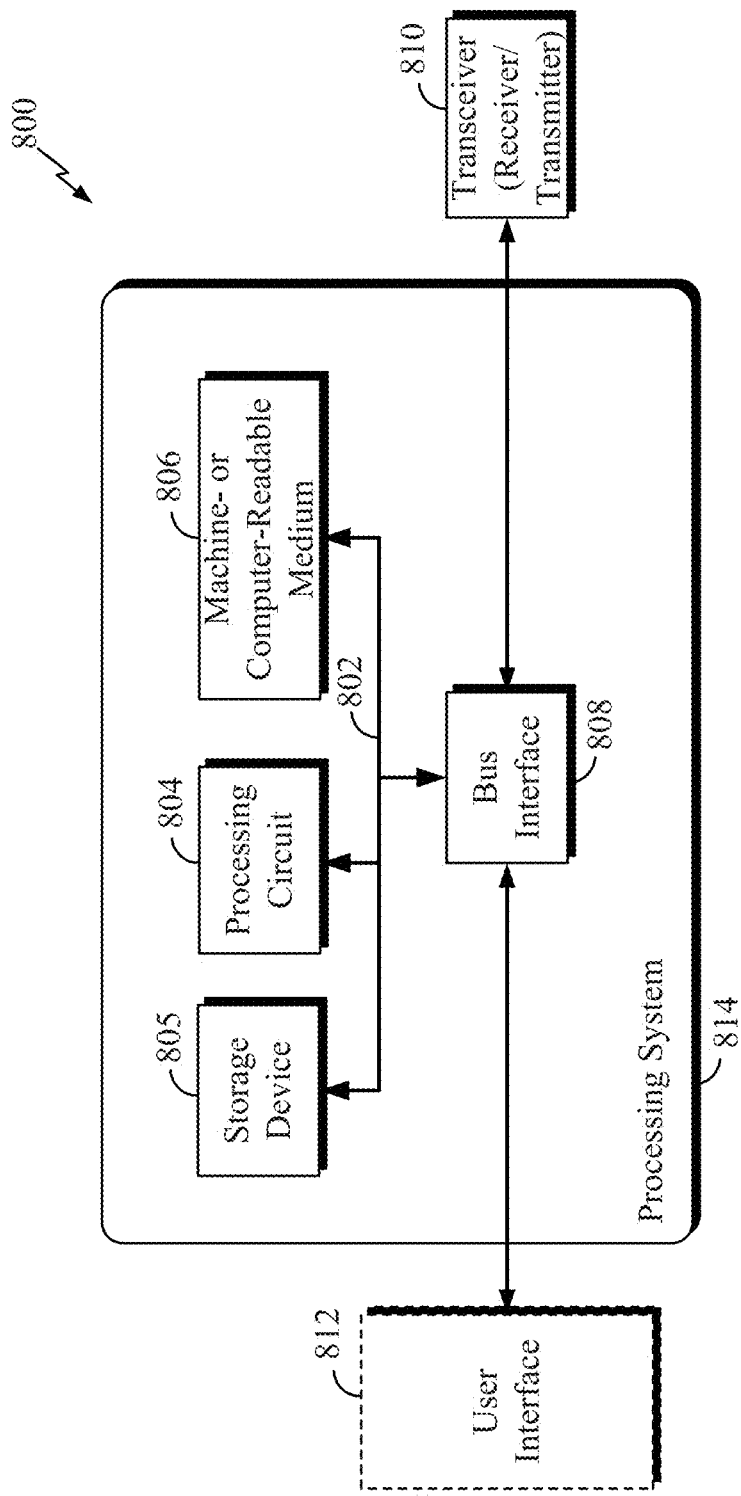
FIG. 8 is a block diagram illustrating an example of a hardware implementation for an apparatus employing a processing system that may exploit the systems, methods and apparatus of FIGS. 1-7.

FIG. 8 illustrates an overall system or apparatus 800 in which the systems, methods and apparatus of FIGS. 1-7 may be implemented. In accordance with various aspects of the disclosure, an element, or any portion of an element, or any combination of elements may be implemented with a processing system 814 that includes one or more processing circuits 804 such as the SoC processing circuit of FIG. 2. For example, apparatus 800 may be a user equipment (UE) of a mobile communication system. Apparatus 800 may be used with a radio network controller (RNC). In addition to an SoC, examples of processing circuits 804 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. Still further, the processing system 814 could be a component of a server such as the server shown in FIG. 1. That is, the processing circuit 804, as utilized in the apparatus 800, may be used to implement any one or more of the processes described above and illustrated in FIGS. 2, 3 and 4 (and those illustrated in FIGS. 11, 12 and 13 and FIGS. 16, 17 and 18, discussed below), such as processes to perform digital signature generation, signing and verification and encryption/decryption.

In the example of FIG. 8, the processing system 814 may be implemented with a bus architecture, represented generally by the bus 802. The bus 802 may include any number of interconnecting buses and bridges depending on the specific application of the processing system 814 and the overall design constraints. The bus 802 links various circuits including one or more processing circuits (represented generally by the processing circuit 804), the storage device 805, and a machine-readable, processor-readable, processing circuit-readable or computer-readable media (represented generally by a non-transitory machine-readable medium 806.) The bus 802 may also link various other circuits such as timing sources, peripherals, voltage regulators, and power management circuits, which are well known in the art, and therefore, will not be described any further. The bus interface 808 provides an interface between bus 802 and a transceiver 810, which may include a receiver and a transmitter. The transceiver 810 provides a means for communicating with various other apparatus over a transmission medium. Depending upon the nature of the apparatus, a user interface 812 (e.g., keypad, display, speaker, microphone, joystick) may also be provided.

The processing circuit 804 is responsible for managing the bus 802 and for general processing, including the execution of software stored on the machine-readable medium 806. The software, when executed by processing circuit 804, causes processing system 814 to perform the various functions described herein for any particular apparatus. Machine-readable medium 806 may also be used for storing data that is manipulated by processing circuit 804 when executing software.

In at least some examples, the processing circuit 804 is configured to obtain first and second public-key/private-key pairs, wherein the first and second public-key/private-key pairs share a common modulus; decrypt a message using a private key of the first public-key/private-key pair; obtain a digital signature for the message by signing the message using a private key of the second public-key/private-key pair; and the transmitter device of the transceiver 810 is configured to send the digital signature from the cryptographic device.

Moreover, in at least some examples, the processing circuit 804 (or other means for processing) provides a means for obtaining first and second public-key/private-key pairs, wherein the first and second public-key/private-key pairs share a common modulus; means for decrypting a message using a private key of the first public-key/private-key pair; means for obtaining a digital signature for the message by signing the message using a private key of the second public-key/private-key pair; and the transmitter device (or other means for transmitting) of the transceiver 810 provides means for sending the digital signature from the cryptographic device. In some examples, the processing circuit is further configured to provide means for obtaining the first and second public-keys (e1, e2) so that the first public key (e1) is not a multiple of the second public key (e2) and/or the second public key (e2) is not a multiple of the first public key (e1). In some examples, the processing circuit is further configured to provide means for obtaining the prime numbers p and q while verifying that p−1 and q−1 are coprime to both the first public key (e1) and the second public key (e2).

Still further, in at least some examples, the receiver device of the transceiver 810 is configured to receive first and second public keys of first and second public-key/private-key pairs from a separate device, wherein the first and second public-key/private-key pairs share a common modulus; and the processing circuit 804 is configured to encrypt a message using the first public key of the first and second public-key/private-key pairs that share the common modulus; send the encrypted message to the separate device using the transmitter device of the transceiver 810; receive a signed reply to the message from the separate device using the receiver device of the transceiver 810, wherein the message has been signed with a signature obtained using a private key of the second public-key/private-key pair; and verify the signature of the signed reply using the second public key of the first and second public-key/private-key pairs that share the common modulus.

Moreover, in at least some examples, the receiver device (or other means for receiving) of the transceiver 810 provides means for receiving first and second public keys of first and second public-key/private-key pairs from a separate device, wherein the first and second public-key/private-key pairs share a common modulus; and the processing circuit 804 (or other means for processing) provides means for encrypting a message using the first public key of the first and second public-key/private-key pairs that share the common modulus; means for sending the encrypted message to the separate device using the transmitter device of the transceiver 810; means for receiving a signed reply to the message from the separate device using the receiver device (or other means for receiving) of the transceiver 810, wherein the message has been signed with a signature obtained using a private key of the second public-key/private-key pair; and means for verifying the signature of the signed reply using the second public key of the first and second public-key/private-key pairs that share the common modulus. In some examples, the first and second public-key/private-key pairs are distinct from one another. In some examples, the first and second public-keys (e1, e2) are such that the first public key (e1) is not a multiple of the second public key (e2) and/or the second public key (e2) is not a multiple of the first public key (e1). In some examples, the common modulus (N) is N=pq where p and q are prime numbers.

One or more processing circuits 804 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 806. The machine-readable medium 806 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 806 may reside in the processing system 814, external to the processing system 814, or distributed across multiple entities including the processing system 814. The machine-readable medium 806 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 806 may have one or more instructions which when executed by the processing circuit 804 causes the processing circuit to: obtain first and second public-key/private-key pairs, wherein the first and second public-key/private-key pairs share a common modulus; decrypting a message using a private key of the first public-key/private-key pair; obtain a digital signature by signing the message using a private key of the second public-key/private-key pair; and send the digital signature from the cryptographic device.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processor 213 illustrated in FIG. 2 may be a specialized processing circuit (e.g., an ASIC)) that is specifically designed and/or hard-wired to perform at least some of the algorithms, methods, and/or blocks described in FIGS. 3, 4 and/or 5 (and/or FIGS. 11, 12 and 13, discussed below) such as those directed to generating common modulus keypairs, decrypting messages and generating digital signatures. Thus, such a specialized processing circuit (e.g., ASIC) may be one example of a means for executing the algorithms, methods, and/or blocks described in FIGS. 3, 4 and/or 5 (and/or FIGS. 11, 12 and 13, discussed below.) The machine-readable storage medium may store instructions that when executed by a specialized processing circuit (e.g., ASIC) causes the specialized processing circuit to perform the algorithms, methods, and/or blocks described herein. In another aspect of the disclosure, the remote server system 108 of FIG. 1 may also include a specialized processing circuit specifically designed and/or hard-wired to perform at least some of the algorithms, methods, and/or blocks described in FIGS. 3 and/or 4 (and/or FIGS. 16, 17 and 18, discussed below) such as those directed to receiving common modulus keypairs, encrypting messages and verifying digital signatures. Thus, such a specialized processing circuit may be one example of a means for executing the algorithms, methods, and/or blocks described in FIGS. 3 and/or 4 (and/or FIGS. 16, 17 and 18, discussed below.) The machine-readable storage medium may store instructions that when executed by a specialized processing circuit (e.g., ASIC) causes the specialized processing circuit to perform the algorithms, methods, and/or blocks described herein.

Figure 9:
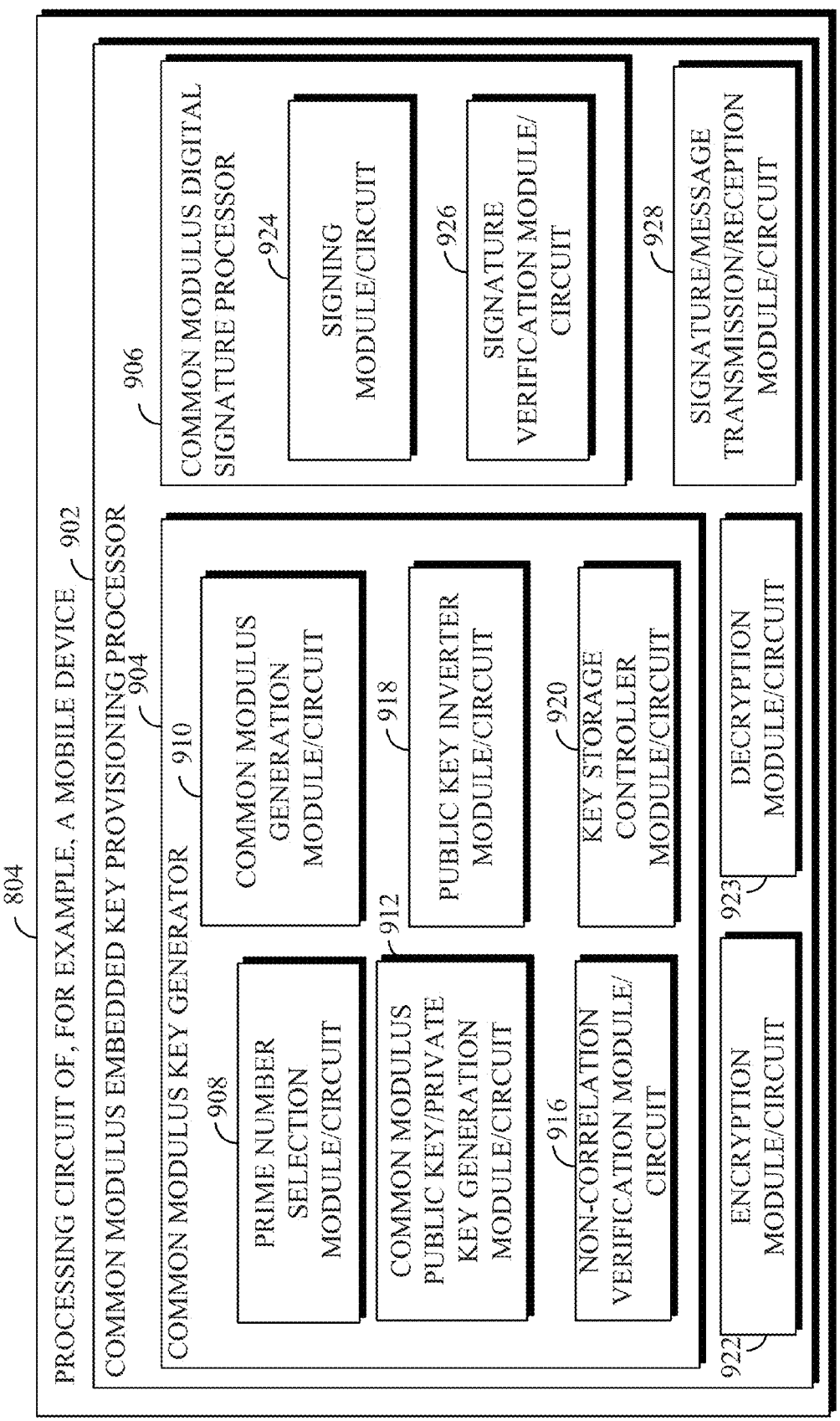
FIG. 9 is a block diagram illustrating exemplary components of the processing circuit of FIG. 8.
Figure 12:
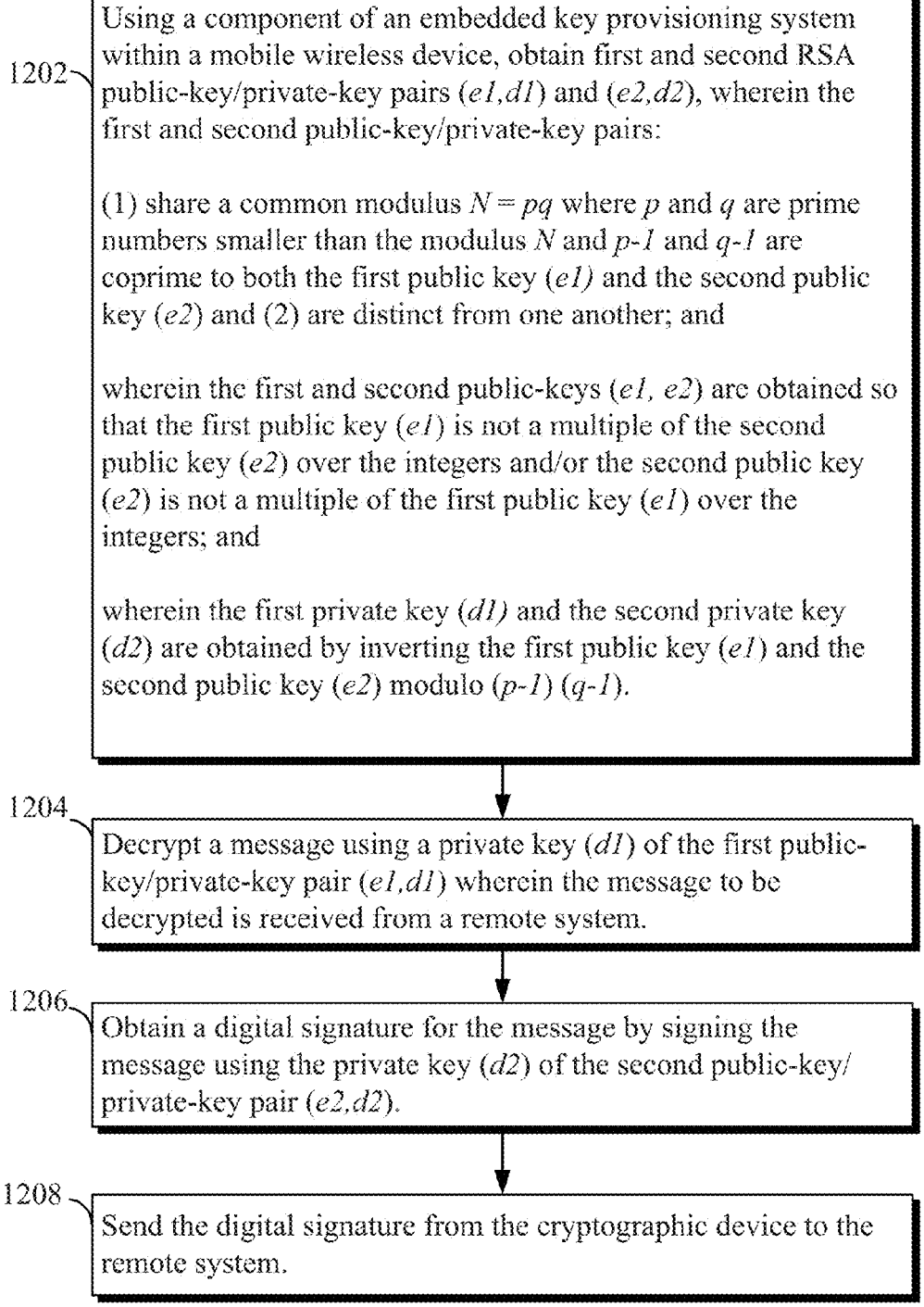
FIG. 12 summarizes further exemplary procedures for use in decrypting and signing messages using, e.g., two keypairs.

FIG. 9 illustrates selected and exemplary components of processing circuit 804 of, e.g., a mobile device having a common modulus embedded key provisioning processor 902 including a common modulus key generator 904. The key generator 904 of FIG. 9 includes: a prime number selection module/circuit 908 operative to obtain or generate prime numbers suitable for generating a common modulus; a common modulus generation module/circuit 910 operative to obtain or generate a common modulus using the prime numbers; and a common modulus public key/private key generation module/circuit 912 operative to obtain or generate first and second public-key/private-key pairs, wherein the first and second public-key/private-key pairs share a common modulus. As explained above, three or more keypairs may be generated with at least one keypair per type (i.e. at least one for encryption/decryption and at least one for signing/verifying) and where all of the keypairs satisfy the condition that the public exponents cannot divide each other (over the integers.) An example where first and second keypairs are generated is shown in FIG. 12 (described below) and an example where three or more keypairs are generated is shown in FIG. 13 (also described below.) To generate the public-key/private-key pairs, a public key inverter module/circuit 918 may be used to invert the public keys to create the private keys. A non-correlation verification module/circuit 916 may be employed to verify that the first and second public-key/private-key pairs are uncorrelated. A key storage controller 920 controls the storage of the public-key/private-key pairs.

The embedded key provisioning processor 902 also has an encryption module/circuit 922 operative to encrypt messages using the first public-key/private-key pair and a decryption module/circuit 923 operative to decrypt messages using the first public-key/private-key pair. Still further, the embedded key provisioning processor 902 also has a common modulus digital signature processor module/circuit 906 operative to provide, obtain or otherwise generate digital signatures by signing the message using a private key of the second public-key/private-key pair. The digital signature processor module/circuit 906 includes a signing module/circuit 924 operative to sign messages using a private key of the second public-key/private-key pair and a verification module/circuit 926 operative to verify the signatures of messages using a public key of the second public-key/private-key pair. A signature message transmission/reception module/circuit 928 is operative to receive and/or transmit encrypted messages and signed messages and messages that are both encrypted and signed.

Figure 10:
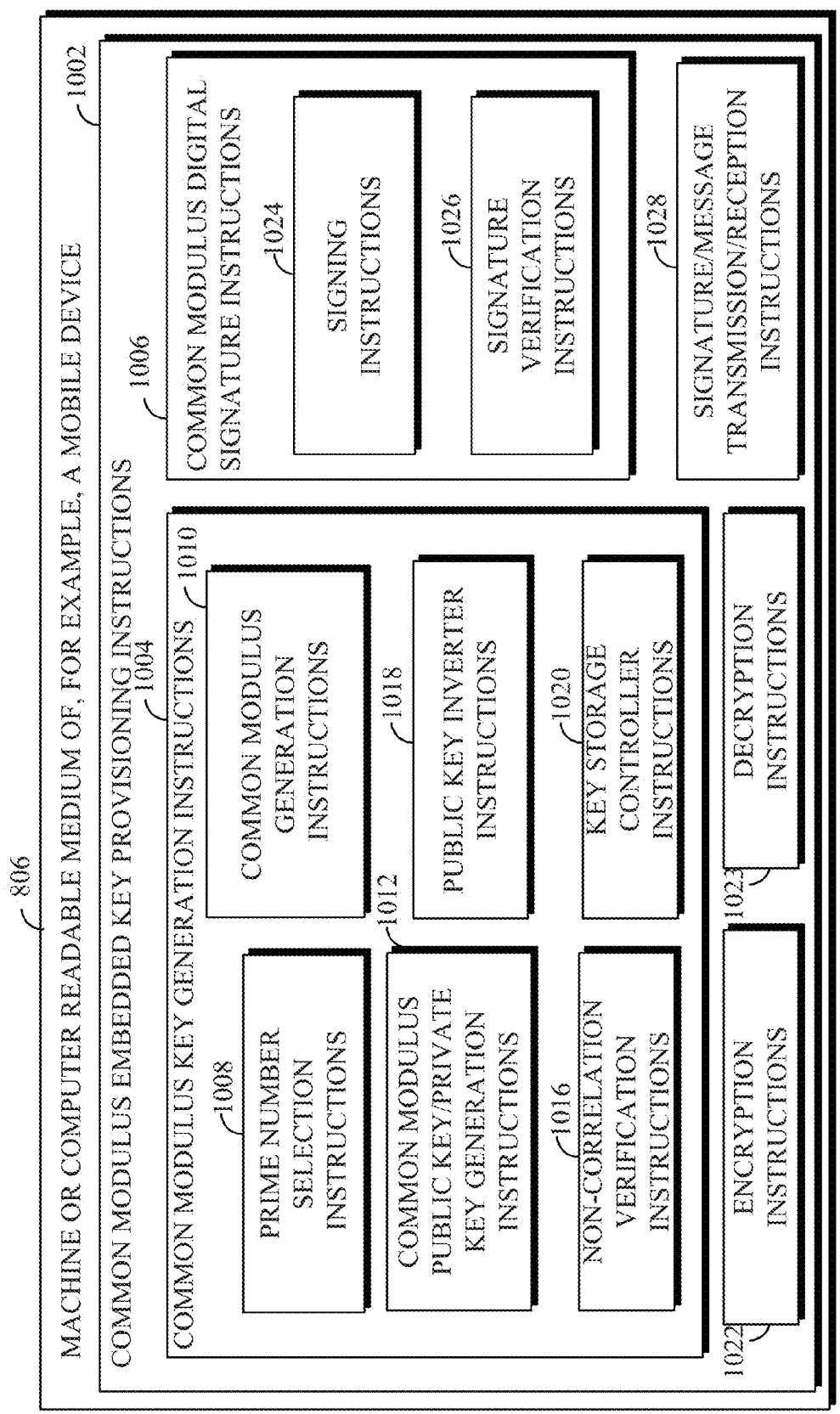
FIG. 10 is a block diagram illustrating exemplary instruction components of the machine-readable medium of FIG. 8.

FIG. 10 illustrates selected and exemplary instructions of computer- or machine-readable medium 806 for use in key provisioning. A set of common modulus embedded key provisioning instructions 1002 are provided including common modulus key generating instructions 1004, which when executed by the processing circuit 804 of FIG. 8, cause the processing circuit to control or perform key provisioning and related operations. The key generating instructions 1004 of FIG. 10 include: prime number selection instructions 1008 operative to obtain or generate prime numbers suitable for generating a common modulus; common modulus generation instructions 1010 operative to obtain or generate a common modulus using the prime numbers; and common modulus public key/private key generation instructions 1012 operative to obtain or generate at least first and second public-key/private-key pairs, wherein the first and second public-key/private-key pairs share a common modulus. As noted, three or more keypairs may be generated with at least one keypair per type (i.e. at least one for encryption/decryption and at least one for signing/verifying) and where all of the keypairs satisfy the condition that the public exponents cannot divide each other (over the integers.) To generate the public-key/private-key pairs, public key inverter instructions 1018 may be used to invert to public keys to create the private keys. Non-correlation verification instructions 1016 may be employed to verify that the first and second public-key/private-key pairs are uncorrelated. Key storage controller instructions 1020 control the storage of the public-key/private-key pairs.

The embedded key provisioning instructions 1002 also include encryption instructions 1022 operative to encrypt messages using the first public-key/private-key pair and decryption instructions 1023 operative to decrypt messages using the first public-key/private-key pair. Still further, the embedded key provisioning instructions 1002 also include common modulus digital signature processor instructions 1006 operative to provide, obtain or otherwise generate digital signatures by signing the message using a private key of the second public-key/private-key pair. The digital signature processor instructions 1006 include signing instructions 1024 operative to sign messages using a private key of the second public-key/private-key pair and verification instructions 1026 operative to verify the signatures of messages using a public key of the second public-key/private-key pair. Signature message transmission/reception instructions 1028 are operative to receive and/or transmit encrypted messages and signed messages and messages that are both encrypted and signed.

Figure 11:
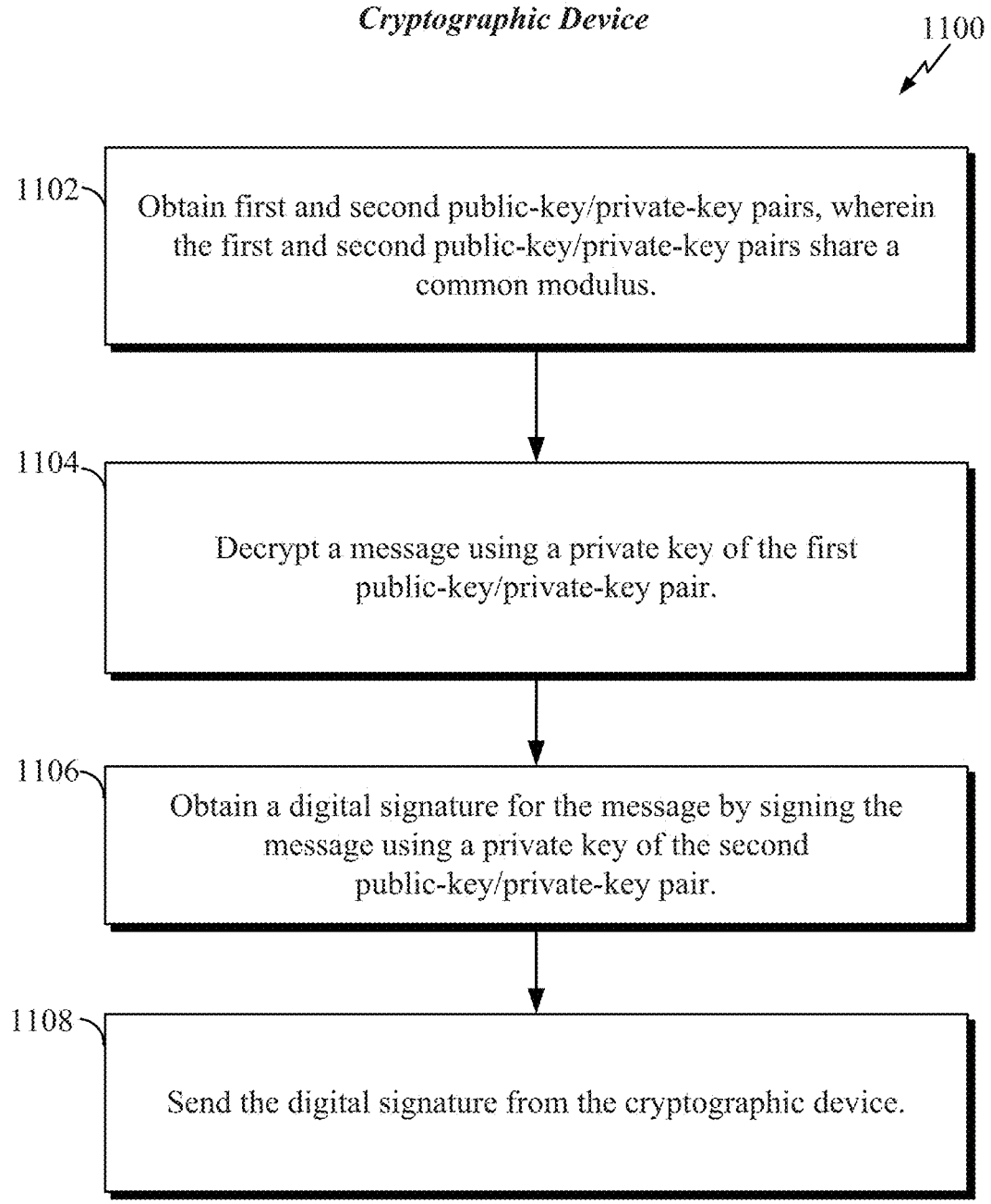
FIG. 11 summarizes exemplary procedures for use in decrypting and signing messages that may be performed by, e.g., an embedded component of a mobile device.

FIG. 11 broadly illustrates and summarizes methods or procedures 1100 that may be performed by the processing circuit 804 of FIG. 8 or other suitably equipped cryptographic devices for generating or otherwise obtaining public-key/private-key pairs and for decrypting and signing messages. At 1102, the cryptographic device obtains first and second public-key/private-key pairs, wherein the first and second public-key/private-key pairs share a common modulus. At 1104, the cryptographic device decrypts a message using a private key of the first public-key/private-key pair. At 1106, the cryptographic device obtains a digital signature for the message by signing the message using a private key of the second public-key/private-key pair. At 1108, the cryptographic device sends the digital signature from the cryptographic device.

FIG. 12 illustrates and summarizes further methods or procedures 1200 that may be performed by the processing circuit 804 of FIG. 8 or other suitably equipped cryptographic devices for generating or otherwise obtaining public-key/private-key pairs and for decrypting and signing messages. The cryptographic device may be a component of an embedded key provisioning system within a mobile wireless device. At 1202, the cryptographic device obtains first and second RSA public-key/private-key pairs (e1,d1) and (e2,d2), wherein the first and second public-key/private-key pairs: (1) share a common modulus N =pq where p and q are prime numbers smaller than the modulus N and p−1 and q−1 are coprime to both the first public key (e1) and the second public key (e2) and (2) are distinct from one another; and wherein the first and second public-keys (e1, e2) are obtained so that the first public key (e1) is not a multiple of the second public key (e2) over the integers and/or the second public key (e2) is not a multiple of the first public key (e1) over the integers; and wherein the first private key (d1) and the second private key (d2) are obtained by inverting the first public key (e1) and the second public key (e2) modulo (p−1) (q−1). At 1204, the cryptographic device decrypts a message using a private key of the first public-key/private-key pair (e1,d1) wherein the message to be decrypted is received from a remote system (such as the partner server of FIG. 1.) At 1206, the cryptographic device obtains a digital signature for the message by signing the message using the private key (d2) of the second public-key/private-key pair (e2,d2). At 1206, the cryptographic device sends the digital signature from the cryptographic device to the remote system.

FIG. 13 illustrates an example wherein more than two keypairs are generated with at least one keypair per type (i.e. at least one for encryption/decryption and at least one for signing/verifying) where all satisfy the condition that the public exponents of the keypairs cannot divide each other (over the integers.) That is, FIG. 13 illustrates and summarizes further methods or procedures 1300 that may be performed by the processing circuit 804 of FIG. 8 or other suitably equipped cryptographic devices for generating or otherwise obtaining public-key/private-key pairs and for decrypting and signing messages while using three or more keypairs. At 1302, the cryptographic device obtains public-key/private-key pairs (e1,d1) . . . (en,dn), where n is greater than 2 (i.e. three or more) and wherein the public-key/private-key pairs: (1) share a common modulus N=pq where p and q are prime numbers smaller than the modulus N and p−1 and q−1 are coprime to all of the public keys (e1 . . . en) and (2) are each distinct from one another; and wherein each of the public-keys (e1 . . . en) is obtained so that each public key is not a multiple of any of the other public keys over the integers; and wherein each individual private key is obtained by inverting a corresponding public key modulo (p−1) (q−1). At 1304, the cryptographic device decrypts a message using one of the private keys of the public-key/private-key pairs wherein the message to be decrypted is received from a remote system. At 1306, the cryptographic device obtains a digital signature for the message by signing the message using a private key of one of the other public-key/private-key pairs. At 1308, the cryptographic device sends the digital signature from the cryptographic device to the remote system.

Thus, FIGS. 8-13 illustrate and summarize various aspects related to the use of a common modulus cryptographic processing component of a mobile device or the like, which is operative to generate and exploit common modulus keypairs. FIGS. 14-18 illustrate and summarize various aspects related to the use of common modulus components of a remote system such as a partner software server, which is operative to receive and exploit the public keys of the common modulus keypairs.

Figure 14:
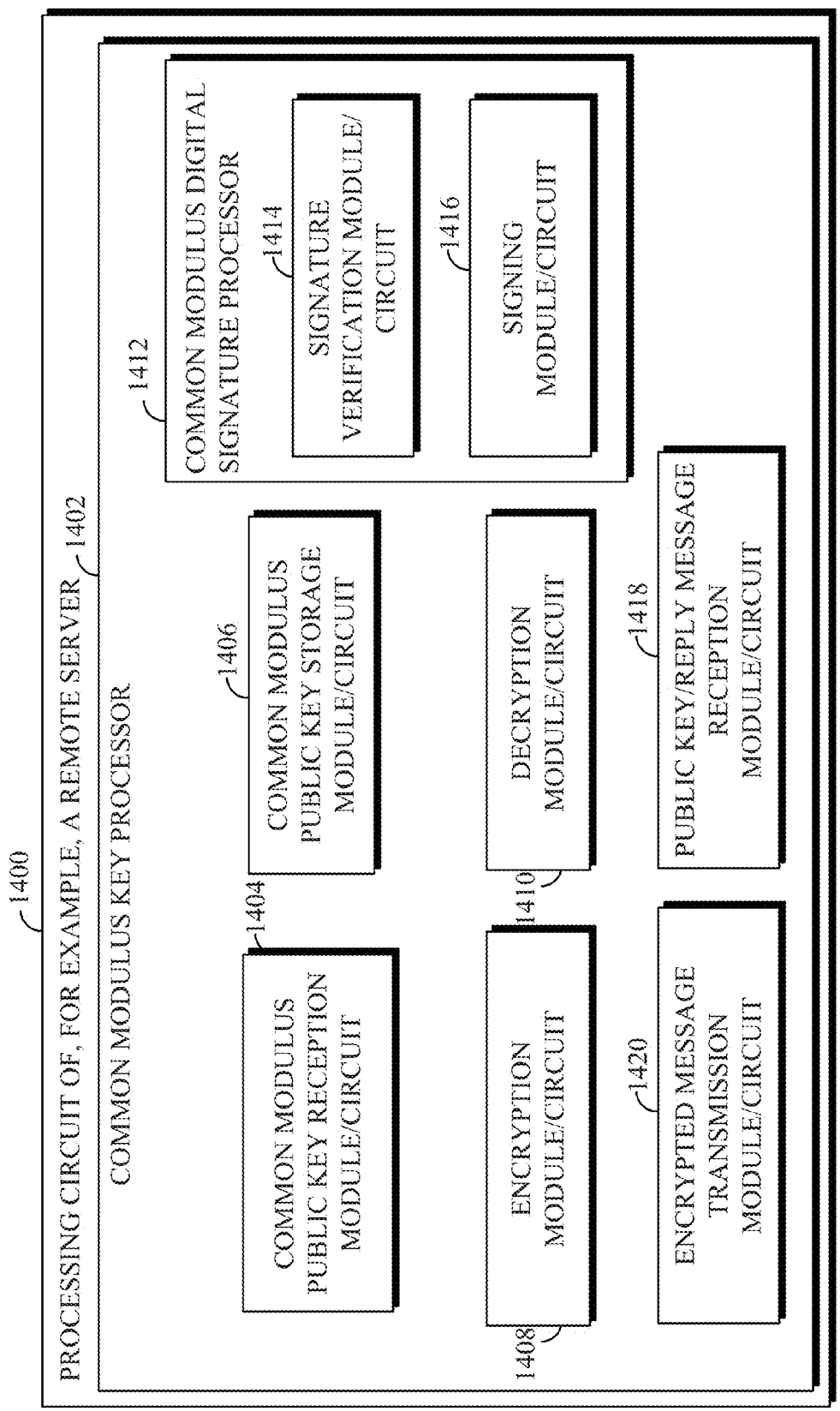
FIG. 14 is a block diagram illustrating exemplary components of a remote system that may be in communication with the apparatus of FIG. 8.

FIG. 14 illustrates selected and exemplary components of processing circuit 1400 of, e.g., a remote server (such as the server system 108 of FIG. 1) having a common modulus key processor 1402 including a common modulus public key reception module/circuit 1404 operative to receive two or more public keys that share a common modulus, which may be stored using common modulus public key storage module/circuit 1406. For example, the public key reception module/circuit 1404 may receive first and second public keys of first and second public-key/private-key pairs from the device of FIG. 9, wherein the first and second public-key/private-key pairs share a common modulus. Encryption of outgoing messages (to, e.g., the device of FIG. 9) using at least one of the common modulus public keys may be performed using an encryption module/circuit 1408 to, e.g., encrypt a message using a first public key of the first and second public-key/private-key pairs. Decryption of any received messages may be performed using at least one private key of the remote system using a decryption module/circuit 1410.

Still further, a common modulus digital signature processor module/circuit 1412 is operative to control signature verification procedures and the like using common modulus keypairs. More specifically, a verification module/circuit 1414 is operative to verify the signatures of messages received by the remote system wherein verification uses a public key of a common modulus keypair. For example, verification module/circuit 1414 may verify the signature of a signed reply received from the device of FIG. 9 using the second public key of a pair of common modulus keypairs. A signing module/circuit 1416 may also be provided to provide, obtain or otherwise generate digital signatures by signing a message using a private key of the remote system. A public key/reply message reception module/circuit 1418 is operative to receive public keys that share a common modulus from a remote device, such as the device of FIG. 9, for receiving signed reply messages from the remote device, and for receiving other information or data. An encrypted message transmission module/circuit 1420 is operative to transmit an encrypted message to the remote device and for transmitting other information or data.

Figure 15:
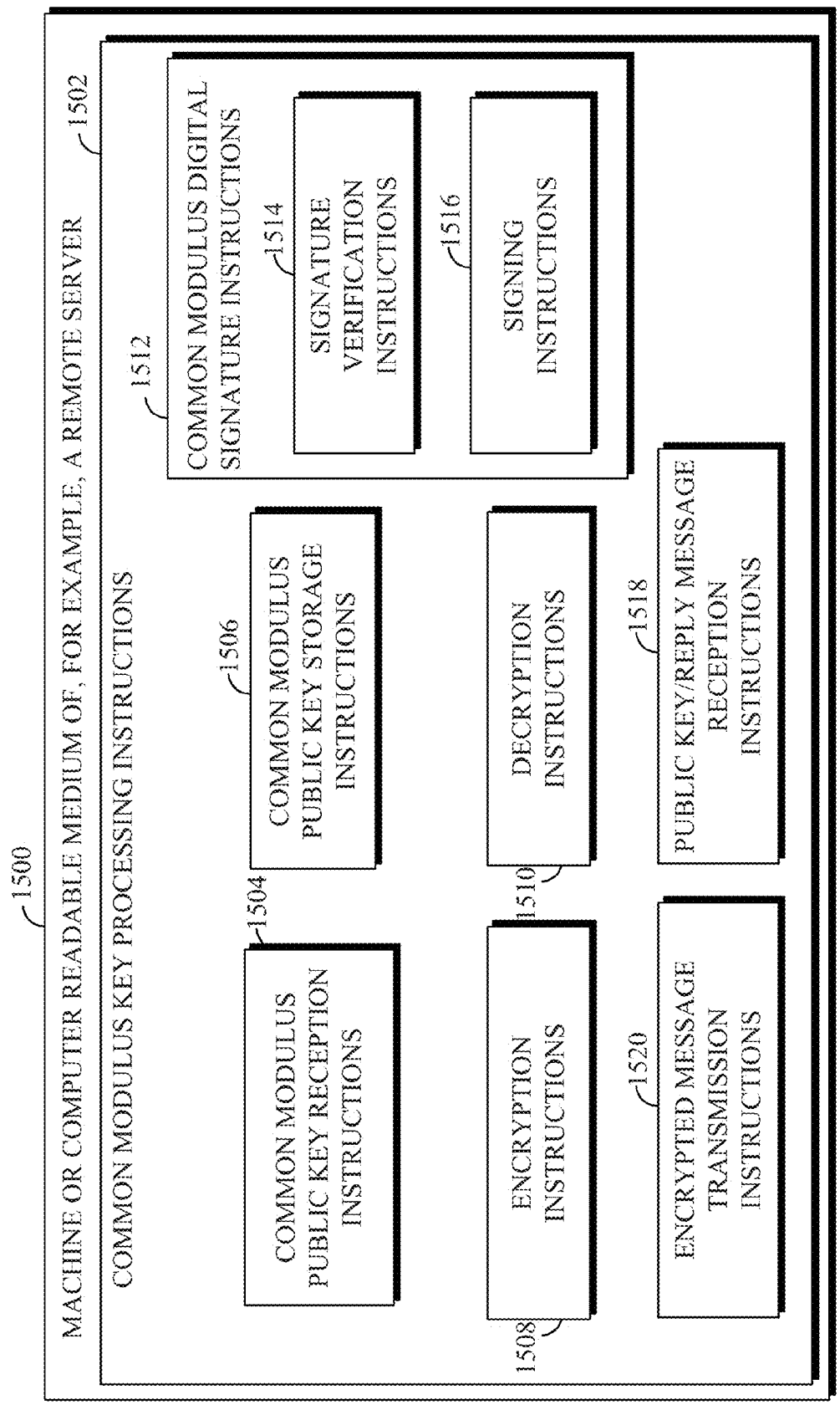
FIG. 15 is a block diagram illustrating exemplary instruction components of a remote system that may be in communication with the apparatus of FIG. 8.

FIG. 15 illustrates selected and exemplary instructions of machine- or computer-readable medium 1500 for use in processing and exploiting common modulus public key pairs. A set of common modulus key provisioning instructions 1502 are provided, which when executed by a processing circuit of, for example, a remote server system causes the system to control or perform key provisioning and related operations. The common modulus key processing instructions of FIG. 15 include: common modulus public key reception instructions 1504 operative to receive two or more public keys that share a common modulus, which may be stored under the control of common modulus public key storage instructions 1506. For example, public key reception instructions 1504 may control the reception of first and second public keys of first and second public-key/private-key pairs from the device of FIG. 9, wherein the first and second public-key/private-key pairs share a common modulus. Encryption of outgoing messages (to, e.g., the device of FIG. 9) using at least one of the common modulus public keys may be performed using encryption instructions 1508 to, for example, encrypt a message using a first public key of the first and second public-key/private-key pairs. Decryption of any received messages may be performed using at least one private key of the remote system using decryption instructions 1510.

Still further, common modulus digital signature processor instructions 1512 are operative to control signature verification procedures and the like using common modulus keypairs. More specifically, verification instructions 1514 are operative to verify the signatures of messages received by the remote system wherein verification uses a public key of a common modulus keypair. For example, verification instructions 1514 may verify the signature of a signed reply received from the device of FIG. 9 using the second public key of a pair of common modulus keypairs. Signing instructions 1516 may also be provided to provide, obtain or otherwise generate digital signatures by signing a message using a private key of the remote system. Public key/reply message reception instructions 1518 are operative to receive public keys that share a common modulus from a remote device, such as the device of FIG. 9, for receiving signed reply messages from the remote device, and for receiving other information or data. Encrypted message transmission instructions 1520 are operative to transmit an encrypted message to the remote device and for transmitting other information or data.

Figure 16:
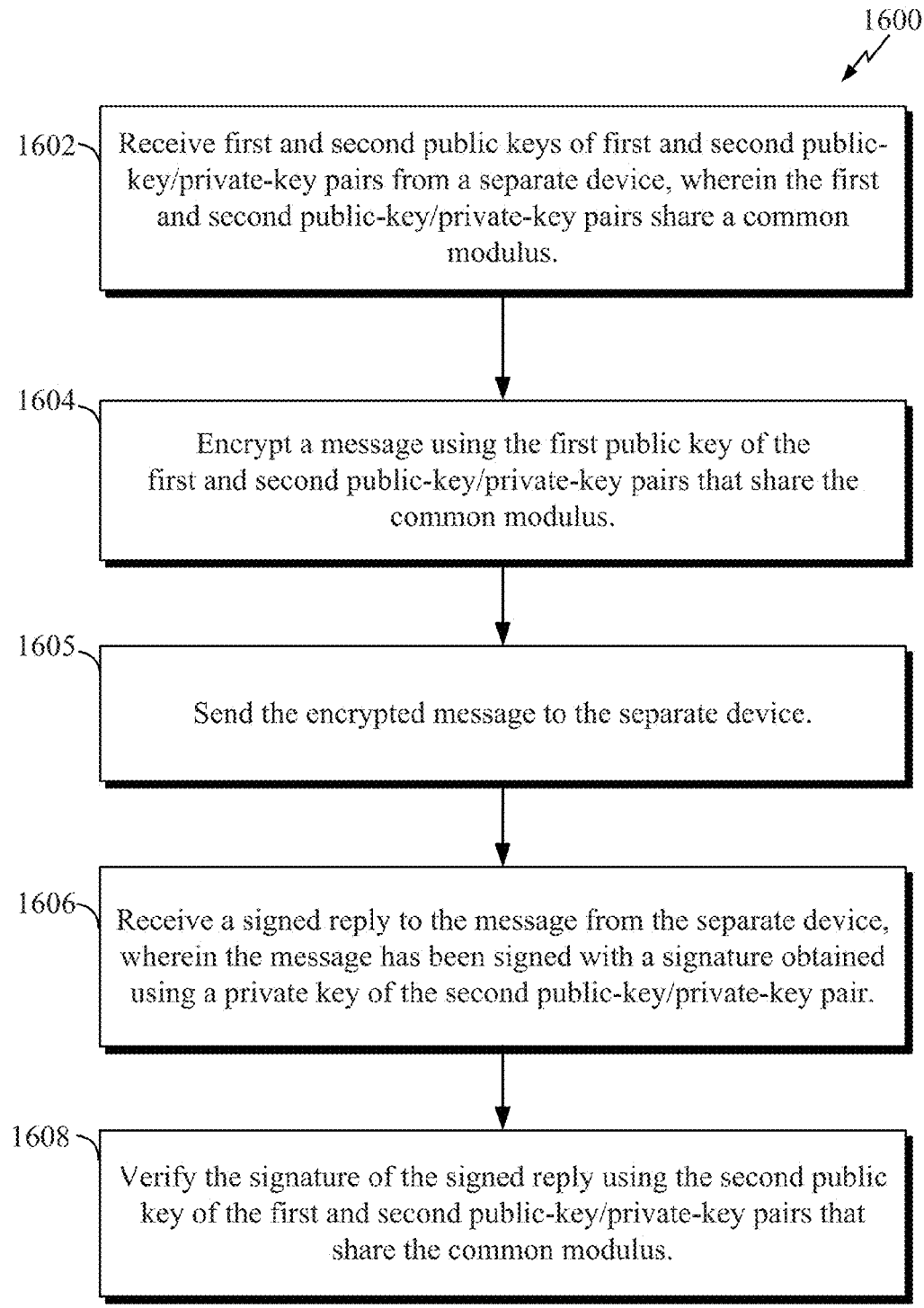
FIG. 16 summarizes exemplary procedures for use in encrypting and verifying messages that may be performed, for example, by the system of FIG. 14.

FIG. 16 broadly illustrates and summarizes methods or procedures 1600 that may be performed by a system (such as one incorporating the device of FIG. 14) in communication with a cryptographic device (such as the device of FIG. 9) for encrypting and verifying messages. At 1602, the system receives first and second public keys of first and second public-key/private-key pairs from a separate device, wherein the first and second public-key/private-key pairs share a common modulus. At 1604, the system encrypts a message using the first public key of the first and second public-key/private-key pairs that share a common modulus. At 1605, the system sends the encrypted message to the separate device. At 1606, the system receives a signed reply to the message from the separate device, wherein the message has been signed with a signature obtained using a private key of the second public-key/private-key pair. At 1608, the system verifies the signature of the signed reply using the second public key of the first and second public-key/private-key pairs that share a common modulus.

FIG. 17 broadly illustrates and summarizes further methods or procedures 1700 that may be performed by a system (such as a system having the device of FIG. 14) in communication with a cryptographic device (such as the device of FIG. 9) for encrypting and verifying messages. At 1702, the system receives first and second public keys (e1, e2) of RSA public-key/private-key pairs (e1,d1) and (e2,d2), wherein the first and second public-key/private-key pairs: (1) share a common modulus N=pq where p and q are prime numbers smaller than the modulus N and p−1 and q−1 are coprime to both the first public key (e1) and the second public key (e2) and (2) are distinct from one another; and wherein the first and second public-keys (e1, e2) are such that the first public key (e1) is not a multiple of the second public key (e2) over the integers and/or the second public key (e2) is not a multiple of the first public key (e1) over the integers. At 1704, the system encrypts a message using a public key (e1) and sends to the embedded system of a mobile wireless device. At 1706, the system receives a signed reply to the message from the embedded system of the mobile wireless device wherein the message has been signed with a signature obtained using the private key (d2) of the second public-key/private-key pair (e2,d2). At 1708, the system verifies the signature of the signed reply using the second public key (e2).

FIG. 18 broadly illustrates and summarizes further methods or procedures 1800 that may be performed by a system (such as a system having the device of FIG. 14) in communication with a cryptographic device (such as the device of FIG. 9) for encrypting and verifying messages wherein three or more keypairs are employed. At 1802, the system receives three or more public keys (e1 . . . en) of a set of public-key/private-key pairs (e1,d1) . . . (en,dn), where n is greater than 2 and wherein the public keys: (1) share a common modulus N=pq where p and q are prime numbers smaller than the modulus N and p−1 and q−1 are coprime to all of the public keys (e1 . . . en) and (2) wherein each of the public keys (e1 . . . en) are distinct from one another; and wherein each of the public-keys (e1 . . . en) is such that each public key is not a multiple of any of the other public keys over the integers. At 1804, the system encrypts a message using one of the public keys and sends to the embedded system of a mobile wireless device. At 1806, the system receives a signed reply to the message from the embedded system of the mobile wireless device wherein the message has been signed with a signature obtained using a private key of the set of public-key/private-key pairs. At 1808, the system verifies the signature of the signed reply using a public key corresponding to the private key used to obtain the signature. Thus, FIG. 18 illustrates example where more than two keypairs are generated with at least one keypair per type and where all of the keypairs satisfy the condition that the public exponents cannot divide each other (over the integers.)

Note that aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a cryptographic device for decrypting and signing messages, comprising:
    obtaining a first public-key/private-key pair having a private decryption key and a second public-key/private-key pair having a private signing key, wherein the first and second public-key/private-key pairs share a common modulus and are distinct from one another, with the private decryption key sharing the common modulus with at least the private signing key, and wherein the common modulus is formed as a product of first and second primes while verifying that the first prime less one and the second prime less one are coprime to both a public encryption key of the first public-key/private-key pair and a public verification key of the second public-key/private-key pair;
    decrypting a message using the private decryption key of the first public-key/private-key pair;
    obtaining a digital signature for the message by signing the message using the private signing key of the second public-key/private-key pair; and
    sending the digital signature from the cryptographic device.

2. The method of claim 1, wherein a public encryption key and a public verification key (e1, e2) of the first and second public-key/private-key pairs are obtained so that the public encryption key (e1) is not a multiple of the public verification key (e2) over the integers and the public verification key (e2) is not a multiple of the public encryption key (e1) over the integers.

3. The method of claim 1, wherein the common modulus (N) is N=pq and wherein p and q are smaller than the modulus N and wherein the common modulus (N) is formed as a product of prime numbers p and q obtained while verifying that p−1 and q−1 are coprime to both the public encryption key of the first public-key/private-key pair and the public verification key of the second public-key/private-key pair.

4. The method of claim 3, further including inverting the public encryption key (e1) modulo (p−1)(q−1) to obtain the private decryption key (d1) and inverting the public verification key (e2) modulo (p−1)(q−1) to obtain the private signing key (d2) to generate the first and second public-key/private-key pairs so that the first and second public-key/private-key pairs are mathematically uncorrelated.

5. The method of claim 1, wherein the cryptographic device is a component of a mobile wireless device and wherein the message decrypted using the first public-key/private-key pair is received from a remote server of a software vendor in partnership with a manufacturer of the mobile wireless device.

6. The method of claim 1, wherein a public encryption key of the first public-key/private-key pair is sent to a remote server and wherein the message to be decrypted is encrypted under the public encryption key of the first public-key/private-key pair and obtained from the remote server.

7. The method of claim 6, wherein sending the digital signature includes signing a reply message using the private signing key of the second public-key/private-key pair in reply to the message obtained from the remote server and sending the reply message to the remote server for verification based on the public verification key of the second public-key/private-key pair and wherein the method further includes obtaining an acknowledgement from the remote server if the reply message is verified.

8. The method of claim 6, wherein the public encryption and public verification keys of the first and second public-key/private-key pairs are sent to each of plurality of Trusted Applications of corresponding Trusted Execution Environments of each of a plurality of remote partner servers and wherein each of the plurality of Trusted Applications of each of the plurality of partner servers is sent the same public encryption and public verification keys of the same first and second public-key/private-key pairs.

9. The method of claim 1, wherein the common modulus (N) is formed as a product of more than two primes N = $p_1 * p_2 * \ldots p_r$, where $p_i$ for i=1,2, . . . ,r are all primes and wherein public encryption and public verification keys (e1, e2) of the first and second public-key/private-key pairs are obtained so that e1 and e2 are also coprime to each of the $p_i-1$ for i=1,2, . . . ,r.

10. The method of claim 1, wherein the common modulus is formed as a product of more than two distinct primes, and wherein public encryption and public verification keys of the first and second public-key/private-key pairs are coprime to each of the distinct primes whose product forms the common modulus.

11. A device comprising:
    a processing circuit configured to
        obtain a first public-key/private-key pair having a private decryption key and a second public-key/private-key pair having a private signing key, wherein the first and second public-key/private-key pairs share a common modulus and are distinct from one another, with the private decryption key sharing the common modulus with at least the private signing key, and wherein the processing circuit is further configured to form the common modulus as a product of first and second primes while verifying that the first prime less one and the second prime less one are coprime to both a public encryption key of the first public-key/private-key pair and a public verification key of the second public-key/private-key pair;
        decrypt a message using the private decryption key of the first public-key/private-key pair;
        obtain a digital signature for the message by signing the message using the private signing key of the second public-key/private-key pair; and
    a transmitter device configured to
        send the digital signature from the cryptographic device.

12. The device of claim 11, wherein the processing circuit is further configured to obtain a public encryption key and a public verification key (e1, e2) of the first and second public-key/private-key pairs so that the public encryption public key (e1) is not a multiple of the public verification key (e2) and the public verification key (e2) is not a multiple of the public encryption key (e1) over the integers.

13. The device of claim 11, wherein the common modulus (N) is N =pq and wherein p and q are smaller than the modulus N and wherein the common modulus (N) is formed as a product of prime numbers p and q obtained while verifying that p−1 and q−1 are coprime to both the public encryption key of the first public-key/private-key pair and the public verification key of the second public-key/private-key pair.

14. The device of claim 13, wherein the processor is further configured to invert the public encryption key (e1) modulo (p−1) (q−1) to obtain the private decryption key (d1) and inverting the public verification key (e2) modulo (p−1) (q−1) to obtain the private signing key (d2) to generate the first and second public-key/private-key pairs so that the first and second public-key/private-key pairs are mathematically uncorrelated.

15. The method of claim 14, wherein the first and second public-key/private-key pairs are obtained by inverting the public encryption key (e1) modulo (p−1) (q−1) to obtain the private decryption key (d1) and inverting the public verification key (e2) modulo (p−1) (q−1) to obtain the private signing key (d2) so that the first and second public-key/private-key pairs are mathematically uncorrelated.

16. The device of claim 11, further including a receiver and wherein the message decrypted using the first public-key/private-key pair is received from a remote server of a software vendor in partnership with a manufacturer of the mobile wireless device using the receiver and wherein the encrypted message is signed with a distinct manufacturer key provided by the manufacturer that chains back to a certificate in the embedded key provisioning system.

17. The device of claim 11, wherein the common modulus (N) is a product of more than two primes N =$p_1$ * $p_2$ * . . . * $p_r$, where $p_i$ for i=1,2, . . . ,r are all primes and wherein public encryption and public verification keys (e1, e2) of the first and second public-key/private-key pairs are obtained so that e1 and e2 are also coprime to each of the $p_i$_1 for i=1,2, . . . ,r.

18. The device of claim 11, wherein the processing circuit is further configured to form the common modulus as a product of more than two distinct primes, and wherein public encryption and public verification keys of the first and second public-key/private-key pairs are coprime to each of the distinct primes whose product forms the common modulus.

19. A method operational in a system for encrypting and verifying messages, comprising:
receiving a public encryption key of a first public-key/private-key pair and a public verification key of a second public-key/private-key pair from a separate device, wherein the first and second public-key/private-key pairs share a common modulus and are distinct from one another, with the public encryption key sharing the common modulus with at least the public verification key, and wherein the common modulus is formed as a product of first and second primes while verifying that the first prime less one and the second prime less one are coprime to both a public encryption key of the first public-key/private-key pair and a public verification key of the second public-key/private-key pair;
encrypting a message using the public encryption key of the first and second public-key/private-key pairs that share the common modulus;
sending the encrypted message to the separate device;
receiving a signed reply to the message from the separate device, wherein the message has been signed with a signature obtained using a private signing key of the second public-key/private-key pair; and
verifying the signature of the signed reply using the public verification key of the first and second public-key/private-key pairs that share the common modulus.

20. The method of claim 19, wherein a public encryption key and a public verification key (e1, e2) of the first and second public-key/private-key pairs are such that the public encryption key (e1) is not a multiple of the public verification key (e2) over the integers and the public verification key (e2) is not a multiple of the public encryption key (e1) over the integers.

21. The method of claim 19, wherein the common modulus (N) is a product of more than two primes N =$p_1$ * $p_2$ * . . . * $p_r$, where $p_i$ for i=1,2, . . . ,r are all primes and wherein the public encryption and public verification keys (e1, e2) of the first and second public-key/private-key pairs are such that e1 and e2 are also coprime to each of the $p_i$_1 for i=1,2, . . . ,r.

22. The method of claim 19, wherein the common modulus is formed as a product of more than two distinct primes, and wherein public encryption and public verification keys of the first and second public-key/private-key pairs are coprime to each of the distinct primes whose product forms the common modulus.

23. The method of claim 19, wherein the common modulus (N) is N =pq and wherein p and q are smaller than the modulus N and wherein the common modulus (N) is formed as a product of prime numbers p and q obtained while verifying that p−1 and q−1 are coprime to both a public encryption key of the first public-key/private-key pair and a public verification key of the second public-key/private-key pair.

24. A device, comprising:
a receiver device configured to receive a public encryption key of a first public-key/private-key pair and a public verification key of a second public-key/private-key pair from a separate device, wherein the first and second public-key/private-key pairs share a common modulus (N) and are distinct from one another, with the public encryption key sharing the common modulus (N) with at least the public verification key, and wherein the common modulus is formed as a product of first and second primes while verifying that the first prime less one and the second prime less one are coprime to both the public encryption key of the first public-key/private-key pair and the public verification key of the second public-key/private-key pair;
a transmitter device; and
a processing circuit configured to
encrypt a message using the public encryption key of the first and second public-key/private-key pairs that share the common modulus;
send the encrypted message to the separate device using the transmitter device;
receive a signed reply to the message from the separate device using the receiver device, wherein the message has been signed with a signature obtained using a private signing key of the second public-key/private-key pair; and verify the signature of the signed reply using the public verification key of the first and second public-key/private-key pairs that share the common modulus.

25. The device of claim 24, wherein the public encryption key and the public verification key (e1, e2) of the first and second public-key/private-key pairs are such that the public encryption key (e1) is not a multiple of the public verification key (e2) and the public verification key (e2) is not a multiple of the public encryption key (e1) over the integers.

26. The device of claim 24, wherein the common modulus (N) is N =pq and wherein p and q are smaller than the modulus N and wherein the common modulus (N) is formed as a product of prime numbers p and q obtained while verifying that p−1 and q−1 are coprime to both the public encryption key of the first public-key/private-key pair and the public signing key of the second public-key/private-key pair.

27. The device of claim 26, wherein the first and second public-key/private-key pairs are obtained by inverting the public encryption key (e1) modulo (p−1)(q−1) to obtain the private decryption key (d1) and inverting the public verification key (e2) modulo (p−1)(q−1) to obtain the private signing key (d2) so that the first and second public-key/private-key pairs are mathematically uncorrelated.

28. The device of claim 24, wherein the separate device is a component of an embedded key provisioning system within a mobile wireless device and wherein the processing circuit is a component of a server of a software vendor in partnership with a manufacturer of the mobile wireless device.

29. The device of claim 24, wherein the common modulus (N) is a product of more than two primes $N = p_1 * p_2 * \ldots * p_r$, where $p_i$ for i=1,2, . . . ,r are all primes and wherein the public encryption and public verification keys (e1, e2) of the first and second public-key/private-key pairs are such that e1 and e2 are also coprime to each of the $p_i-1$ for i=1,2, . . . ,r.

30. The device of claim 24, wherein the common modulus is formed as a product of more than two distinct primes, and wherein public encryption and public verification keys of the first and second public-key/private-key pairs are coprime to each of the distinct primes whose product forms the common modulus.

* * * * *